US008296199B2

(12) United States Patent
Allin et al.

(10) Patent No.: US 8,296,199 B2
(45) Date of Patent: Oct. 23, 2012

(54) CONSTRUCTION PAYMENT MANAGEMENT SYSTEM AND METHOD WITH SUB-TIER DOCUMENT EXCHANGE AND APPROVAL FEATURES

(75) Inventors: Patrick J. Allin, Lake Bluff, IL (US); William H. Eichhorn, Hinsdale, IL (US); Jeffrey K. Wagner, Wheaton, IL (US); John W. Smith, Grayslake, IL (US)

(73) Assignee: Textura Corporation, Deerfield, IL (US)

( * ) Notice: Subject to any disclaimer, the term of this patent is extended or adjusted under 35 U.S.C. 154(b) by 758 days.

(21) Appl. No.: 12/350,810

(22) Filed: Jan. 8, 2009

(65) Prior Publication Data

US 2009/0171724 A1      Jul. 2, 2009

Related U.S. Application Data

(63) Continuation-in-part of application No. 12/061,805, filed on Apr. 3, 2008.

(60) Provisional application No. 60/910,401, filed on Apr. 5, 2007, provisional application No. 60/926,867, filed on Apr. 30, 2007.

(51) Int. Cl.
*G06Q 10/00* (2012.01)
(52) U.S. Cl. ........................................................ 705/30
(58) Field of Classification Search ...................... 705/30
See application file for complete search history.

(56) References Cited

U.S. PATENT DOCUMENTS

| 2006/0247975 A1 * | 11/2006 | Shapiro et al. | 705/14 |
| 2008/0027861 A1 * | 1/2008 | Gendler | 705/40 |

* cited by examiner

*Primary Examiner* — Russell S Glass
(74) *Attorney, Agent, or Firm* — Michael Best & Friedrich LLP

(57) ABSTRACT

Systems and methods for managing a construction payment process wherein a higher degree of functionality is provided to primary users and only a limited subset of functionality is provided to sub-tier contractors. One construction of the system is configured to receive an electronically signed document and a request for payment from the sub-tier contractor. The request for payment is presented to a first primary user who is a contractual parent of the sub-tier contractor. When approval of the request for payment is received, a payment is initiated from a project payor to the sub-tier contractor. In some embodiments, the project payor is a contractual grandparent of the sub-tier contractor and a contractual parent of the first primary user.

15 Claims, 44 Drawing Sheets

CREATE/EDIT USER

- USER PREFERENCES
  - EDIT USER
  - CHANGE PASSWORD

- MESSAGES
  - READ MESSAGES

- PROJECTS
  - BROWSE PROJECTS

- ORGANIZATIONS
  - EDIT ORGANIZATION
  - INVITE ORGANIZATION
  - BROWSE ORGANIZATIONS

- USER MANAGEMENT
  - CREATE USER
  - BROWSE USERS

COMPANY NAME: JOHNSON CONSTRUCTION

FIRST NAME:*
MIDDLE NAME:
LAST NAME:*

USER NAME:* SJENKINS
USER ROLE: REGULAR USER
POSITION:

ADDRESS:*
ADDRESS LINE 2:
CITY:*
STATE/PROVINCE:* ALABAMA
ZIP CODE:*

EMAIL:* SJENKINS@EMAIL.COM
PHONE #1:*
PHONE #2:
MOBILE PHONE:
FAX:

EMAIL NOTIFICATION:
● E-MAIL WITH EACH NOTIFICATION THAT OCCURS
○ E-MAIL ME DAILY WITH ALL THE NOTIFICATION
○ 4 TIMES DAILY
○ NEVER - I WILL GET THEM FROM MY HOMEPAGE

USER CAN:
☐ MANAGE PROJECTS      ☐ SIGN

[SAVE PROFILE]

*FIG. 28*

CREATE PROJECT

PROJECT INFORMATION

PROJECT NAME *
INTERNAL PROJECT NUMBER
PROJECT TYPE * [RESIDENTIAL - NEW ▽]

CONTRACT VALUE *
CONTRACT DATE *
ESTIMATED START DATE * [MMDD/YYYY]
ESTIMATED COMPLETION DATE *

PROJECT FUNDING

BANK NAME *
CITY *
STATE * [ALABAMA ▽]
ROUTING NUMBER *
ACCOUNT NUMBER *

LOAN AMOUNT
APPRAISED VALUE
LOAN TO VALUE PERCENT

PROJECT OWNER

OWNER NAME *
ADDRESS LINE 1 *
ADDRESS LINE 2

CITY *
STATE * [ALABAMA ▽]
ZIP CODE *

Sidebar:

□ USER PREFERENCES
- EDIT USER
- CHANGE PASSWORD

□ MESSAGES
- READ MESSAGES

□ PROJECTS
- BROWSE PROJECTS

□ ORGANIZATIONS
- EDIT ORGANIZATION
- INVITE ORGANIZATION
- BROWSE ORGANIZATIONS

□ USER MANAGEMENT
- CREATE USER
- BROWSE USERS

SITE INFORMATION

ADDRESS LINE 1 *
ADDRESS LINE 2 *
CITY *
STATE *  ALABAMA
ZIP *
PROPERTY LEGAL
DESCRIPTION

COUNTY *
CENSUS TRACT
ASSESSORS PARCEL NO.

HOMEBUILDER  ACB123  CUSTOMER NUMBER  10

SAVE AND ENTER BUDGET      SAVE AS DRAFT

Sub-tier Contractor – Lien Waivers

- USER PREFERENCES
  - EDIT USER
  - CHANGE PASSWORD
- MESSAGES
  - READ MESSAGES
- PROJECTS
  - BROWSE PROJECTS
  - SUBMIT DOCUMENTS

Prepare/Submit Lien Waivers

Total Contract Amount:

Previously Paid:

Current Payment Request

Final? ☑

Optional Text:

PIN #:

SIGN/SUBMIT

CONSTRUCTION PAYMENT MANAGEMENT SYSTEM AND METHOD WITH SUB-TIER DOCUMENT EXCHANGE AND APPROVAL FEATURES

RELATED APPLICATIONS

The present application is a continuation-in-part of prior-filed co-pending U.S. application Ser. No. 12/061,805 filed on Apr. 3, 2008, which claims priority to U.S. Provisional Application No. 60/910,401 filed on Apr. 5, 2007 and U.S. Provisional Application No. 60/926,867 filed on Apr. 30, 2007, the entire contents of which are all herein incorporated by reference.

BACKGROUND OF THE INVENTION

In the construction industry, some companies have invested a large amount of money and time to automate and/or eliminate particular aspects of the invoicing process between the payor (e.g., a builder, a bank, or a property owner) and a payee (e.g., a subcontractor, vendor, or materials supplier).

SUMMARY OF EMBODIMENTS OF THE INVENTION

Comprehensive automated construction payment management systems may be unneeded or undesired by certain participants in the construction industry. However, such participants may still need or desire automated systems for particular aspects of a construction project or process. As such, there remains a need for automated systems or modules that capture invoices and process budgets or schedules of values, check for document compliance (e.g., verify receipt of requested/required documents), and/or exchange an electronically signed lien waiver for a payment. Furthermore, different participants within the same construction project may require different levels of functionality. For example, a general contractor and a prime subcontractor may require the full functionality of a comprehensive construction payment management system, such as described in U.S. application Ser. No. 11/032,699 which is incorporated herein by reference. In the same project, a sub-tier contractor (e.g., a sub-contractor of the prime subcontractor) may have a more limited role that does not necessitate the full functionality of a comprehensive construction payment management system.

As such, some embodiments of the invention provide systems and methods of managing a construction payment process involving three or more participant tiers. A networked computer system is accessible by participants in the construction project. The networked computer system provides comprehensive payment management functionality between participants in the top two tiers including budget monitoring, project scheduling, document exchange, electronic signature, and payment features. The networked computer system provides a subset of construction payment management functionality between participants in the sub-tiers of the construction project.

In some embodiments, the subset of construction payment functionality includes receiving a lien waiver and a signature from a sub-tier contractor. In some embodiments, the subset of construction payment functionality includes initiating a payment to the sub-tier contractor in response to receiving a signed lien waiver and storing a record of the payment in the memory of the networked computer system. The record of the payment is then used to update related documentation in the comprehensive features between the top tier participants in the construction payment management system.

Some embodiments of the invention provide a method and system for approval of received lien waivers and corresponding payment in a multiple tiered construction project management system. A networked computer system is accessible by at least three participants in a construction project wherein the first participant is a contractual child (e.g., subcontractor) of a second participant, and the second participant is a contractual child of the third participant. In some embodiments, the third participant is a payor associated with a construction project. The third participant uses the construction project management system to initiate a request for a document from the first participant. The first participant electronically submits a document through the construction payment management system. A notification is sent to the second participant indicating that the document has been received and requesting approval of a payment related to the document. The second participant approves or denies the payment. If the second participant approves the payment, the networked computer system notifies the third participant of the approved payment and initiates a payment from the third participant to the first participant. In some embodiments, the document is a lien waiver signed by the first participant. The networked computer system releases the signed lien waiver to the third participant only after payment is made to the first participant.

Some embodiments of the invention provide a method and system for tracking and monitoring payments to sub-tier contractors. A networked computer system receives a document from a sub-tier contractor related to a requested payment. The networked computer system stores the document and initiates a payment to the sub-tier contractor. The networked computer system then updates an electronically stored budget to indicate that the payment has been made and identifying the recipient of the payment. In some embodiments, the document is a lien waiver and the networked computer system prevents payments from being made to sub-tier contractors until after the signed lien waiver is received from the sub-tier contractor.

BRIEF DESCRIPTION OF THE DRAWINGS

FIG. 9 is an illustration of a create organization form.

FIG. 12 is an illustration of an edit organization form.

FIG. 20 is an illustration of an edit organization form.

FIG. 23 is an illustration of a create user form.

FIG. 26 is an illustration of a view user screen.

FIG. 28 is an illustration of an edit user form.

FIGS. 31 and 32 are illustrations of a create project form.

FIG. 33 is an illustration of a create compliance requirement form.

FIG. 37 is an illustration of a project user access screen.

FIG. 43 is a user interface screen accessible to a sub-tier contractor with limited functionality.

DETAILED DESCRIPTION

Figure 1:
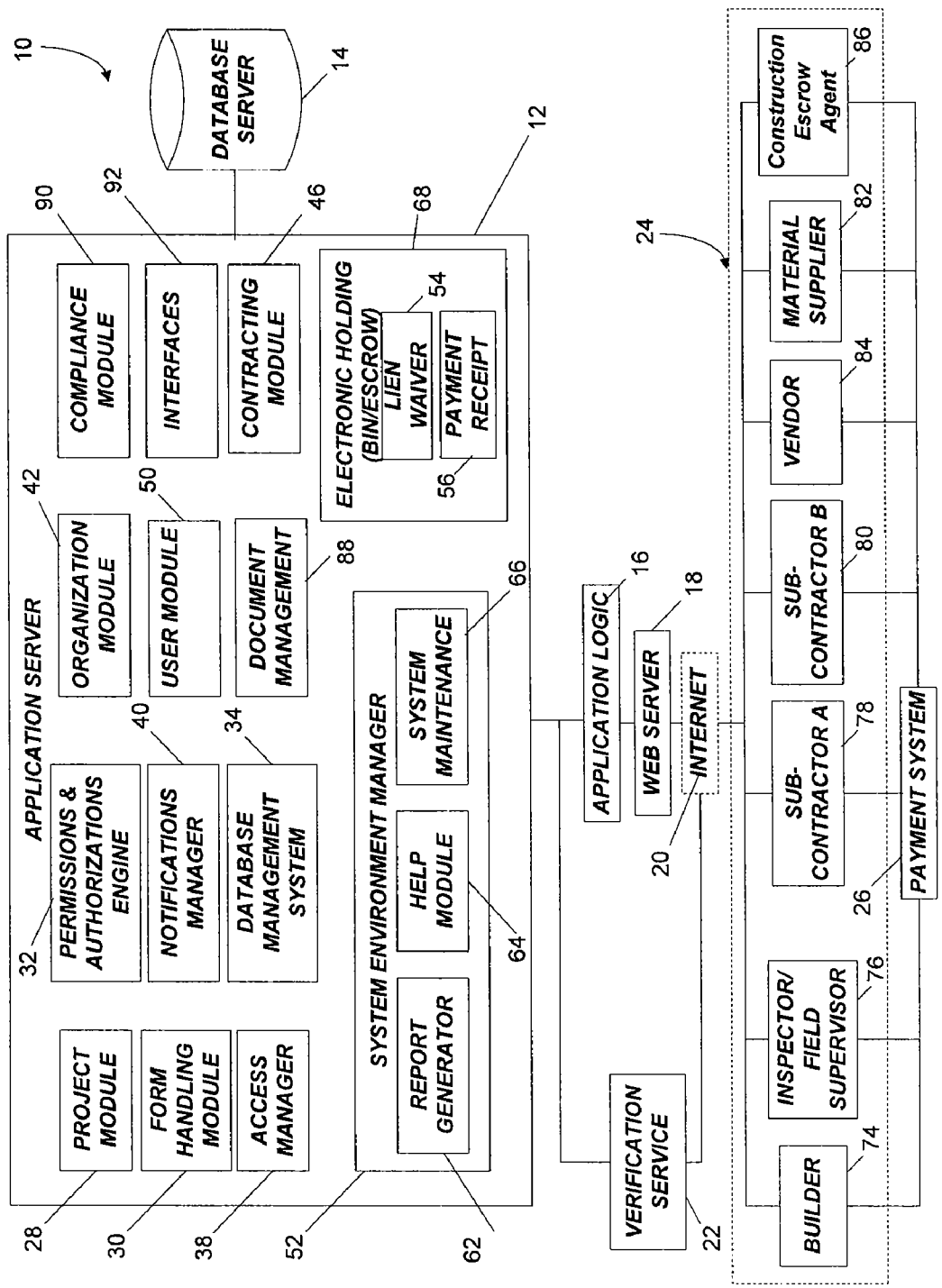
FIG. 1 is a schematic illustration of a construction payment management system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and other alternative configurations are possible.

FIG. 1 illustrates a construction payment management system (CPMS) 10 according to one embodiment of the invention. The CPMS 10 includes an application server 12, a database server 14, an application logic module 16, a web server 18, a network 20 (such as the Internet or other networks individually or in combination with the Internet), a verification service 22, participating organizations or individuals 24 (hereinafter "participant" or "organization"), and a payment system 26. The payment system 26 can include an automated clearing house (ACH) system, a wire transfer system, a debit card system, a credit card system, a check generating system that can generate checks, drafts, bills of exchange, promissory notes, IOUs, debit notes, or other negotiable instruments, or any other suitable electronic funds transfer (EFT) system. The verification service 22 verifies new organizations and/or users before they are allowed to use the CPMS 10.

The application server 12 stores and provides access to a project module 28, a form-handling module 30, a permissions and authorizations engine 32, a database management system 34, an access manager 38, a notifications manager 40, an organization module 42, a contracting module 46, a user module 50, a system environment manager 52, and an electronic holding bin/escrow 68. The system environment manager 52 includes a report generator 62, a help module 64, and a system maintenance module 66. The electronic holding bin/escrow 68 can store electronic lien waivers 54 and other electronic payment receipts 56.

The project module 28 administers the creation of projects and stores project-related information. The form-handling module 30 creates documents based on predefined templates. The permissions and authorizations engine 32 identifies and stores permissions and authorizations for users of the CPMS 10. For example, the permissions and authorizations engine 32 can store permissions that specify which users are allowed to sign on behalf of a particular organization or company. Similarly, the access manager 38 manages access to functions provided by the CPMS 10. For example, the access manager 38 can store permissions and/or project assignments.

The notifications manager 40 generates notifications to users of the CPMS 10. For example, the notifications manager 40 can generate notifications when actions are required and/or for information purposes. The organization module 42 creates and maintains organizations using the CPMS 10. The contracting module 46 provides contracting functions and stores contract information. In some embodiments, the contract information is a data class used for posting transactions. The user module 50 creates and maintains individual user accounts for individuals accessing the CPMS 10.

As shown in FIG. 1, the application server 12 also includes a document management module 88. The document management module 88 functions as a categorization and storage facility for electronic documents.

In some embodiments, the application server 12 also includes a compliance module 90. The compliance module 90 includes an engine that stores compliance requirements and their status (e.g., whether a given contractor has complied with particular requirements). In some embodiments, the requirements stored in the compliance module 90 track whether documentation of a document (e.g., contracts, applications for payment, sworn statements, insurance coverage or bonding or certification documents, pre-lien notices, lien waivers, etc.) has been received from participants 24 associated with a project, and, in some embodiments, provides warnings and offer options for enforcing compliance through the payment process, up to and including automatically holding a payment. The documents can be associated with a particular project, a particular property of a project, a particular budget line item within a project, or with a particular participant or organization. The documents can also be tracked for expiration and the compliance module 90 can generate warnings and reminders of impending expiration of payment holds being applied. The warnings and reminders are forwarded to contractors via the notifications manager and payment holds are placed and/or released through the monitoring functions of the compliance module 90.

As shown in FIG. 1, the application server 12 also includes an interfaces module 92. The interfaces module 92 interfaces with external systems, such as accounting systems, project management systems, and enterprise resource planning (ERP) systems, and transmits information to and/or receives information from the external systems.

It should be understood that the components of the application server 12 could be combined in a different manner than as shown and described with respect to FIG. 1. The software used to code the various modules, managers, and engines of the application server 12 can be combined or separated in any suitable manner and can be stored and accessed in any suitable manner.

The application server 12 can be connected to the database server 14, the application logic module 16, and the verification service 22. However, in some embodiments, the verification service 22 may only be connected to the network 20. The application logic module 16 can be connected to the web server 18 or, in some embodiments, directly to the network 20. The web server 18 can be connected to the network 20.

The participants 24 can include, for example, a builder 74, an inspector/field supervisor 76, one or more subcontractors (Subcontractor A 78, Subcontractor B 80, etc.), one or more material suppliers 82, a vendor 84 and one or more construction escrow agents 86. Although not shown in FIG. 1, other participants, such as a bank, a title company, or a property owner, may also be included. The participants 24 can access the application server 12 in order to use the various modules, managers, and engines to perform construction payment management methods according to several embodiments of the invention.

The participants 24 can be connected to the payment system 26; however, some of the participants 24 might not be connected to the payment system 26 in some embodiments of the invention. In some embodiments, the payment system 26 can include an ACH system with one or more originating depository financial institutions (ODFI) and one or more receiving depository financial institutions (RDFI).

Figure 2:
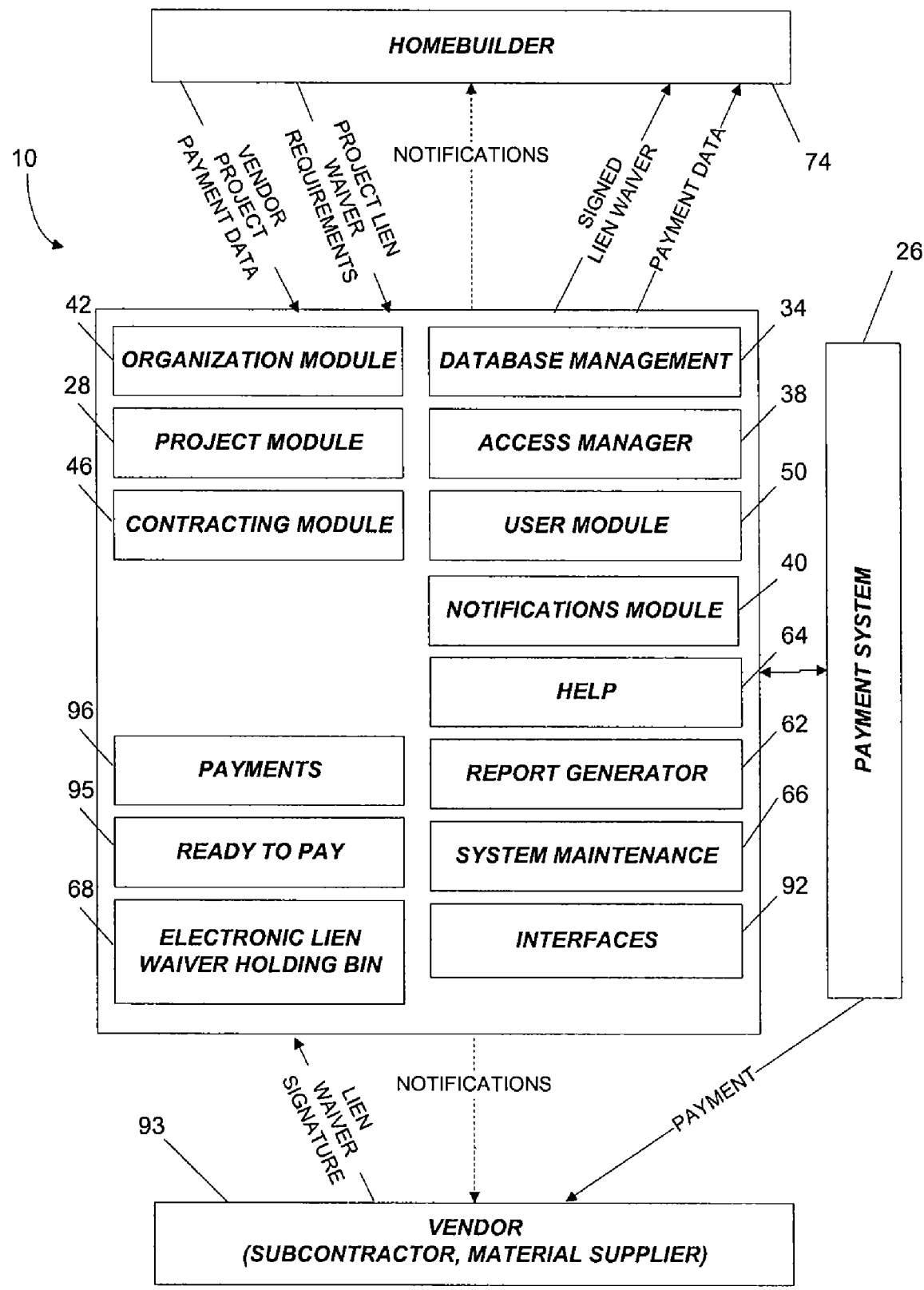
FIG. 2 illustrates a lien waiver exchange workflow of the construction payment management system of FIG. 1 without compliance management.

FIG. 2 illustrates an example of a lien waiver exchange workflow managed by the CPMS 10. In this example, builder 74 is a residential homebuilder; however, the CPMS 10 could be applied to situations where builder 74 is engaged in non-residential construction. Furthermore, similar functionality could be applied to situations where the exchanged document is not a lien waiver 54.

As shown in FIG. 2, a homebuilder 74 can provide the CPMS 10 with project lien waiver requirements. In some embodiments, the homebuilder 74 directly enters the lien waiver requirements into the CPMS 10 (e.g., via a keyboard, a touchscreen, etc.). In other embodiments, the CPMS 10 interfaces with an external system of the homebuilder 74 (e.g., an ERP system) via the interfaces module 92 to obtain the requirements. The lien waiver requirements specify the type of lien waiver required, the dates by which lien waivers must be received in order to receive payment, etc.

After the homebuilder 74 provides the requirements, the homebuilder 74 can provide the CPMS 10 with vendor project payment data. The vendor project payment data can be directly provided by the homebuilder 74 and/or uploaded from an external system of the homebuilder 74 (e.g., an ERP and/or accounting system) via the interfaces module 92. The payment data provided by the homebuilder 74 links a line item with a project, a vendor 93 to be paid, and a requested lien waiver. The payment data includes an amount of a payment to be paid to a particular vendor 93.

When a vendor 93 requests a payment, the CPMS 10 can create an invoice requesting a payment on behalf of the vendor 93. The homebuilder 74 creates an invoice (e.g., using the CPMS 10) on behalf of the vendor 93 that includes a specified payment amount. The vendor 93 views the invoice and approves or disapproves the specified payment amount via the CPMS 10, but cannot modify the payment amount. Once the vendor 93 approves the invoice, the CPMS 10 prompts the vendor 93 to sign a lien waiver in order to initiate payment to the vendor 93. In this manner, the homebuilder 74 specifies the invoice or billed amount submitted by the vendor 93 and, therefore, is often referred to in the industry as "specified billing."

In some embodiments, the CPMS 10 can support "specified payment environments," "specified billing" environments, and invoicing environments, wherein a vendor creates and submits an invoice requesting payment. In some embodiments, the payment amount is specified or set by the vendor 93 (e.g., as a dollar amount or as a percentage of completion), and the homebuilder 74 approves the payment amount (e.g., via the CPMS 10). In some embodiments, the vendor 93 submits an invoice through the CPMS 10. Alternatively, the homebuilder 74 or CPMS 10 can generate an invoice on behalf of the vendor 93 based on the requested payment amount.

After payment data is input into the CPMS 10, the CPMS 10 prompts a vendor 93 (e.g., via a notification) to sign a lien waiver via an electronic signature module of the CPMS 10. The lien waiver can be a partial or a final lien waiver.

Once the vendor 93 electronically signs the lien waiver and submits the lien waiver to the CPMS 10, the CPMS 10 stores the lien waiver in the electronic holding bin 68 and automatically queues a payment to the vendor 93. As shown in FIG. 2, the CPMS 10 of this example includes a ready-to-pay module 95 that stores queued payments. Once the payment is ready to execute, the CPMS 10 initiates a payment to the vendor 93 (e.g., via the payment system 26). For example, the CPMS 10 can initiate a payment to the vendor 93 via ACH.

The CPMS 10 also allows the homebuilder 74 access to the signed lien waiver. In some embodiments, however, the CPMS 10 prevents the homebuilder 74 from viewing the signature on the lien waiver until payment to the vendor 93 is confirmed. Once the payment is confirmed, the CPMS 10 also provides a receipt of payment (e.g., via a notification) to the vendor 93. In addition, the CPMS 10 can create a payment record, which the CPMS 10 stores internally in a payment module 96 and provides to the homebuilder 74 (e.g., via an external ERP or accounting system of the homebuilder 74). In some embodiments the payment record can include an ACH record or file.

Figure 3:
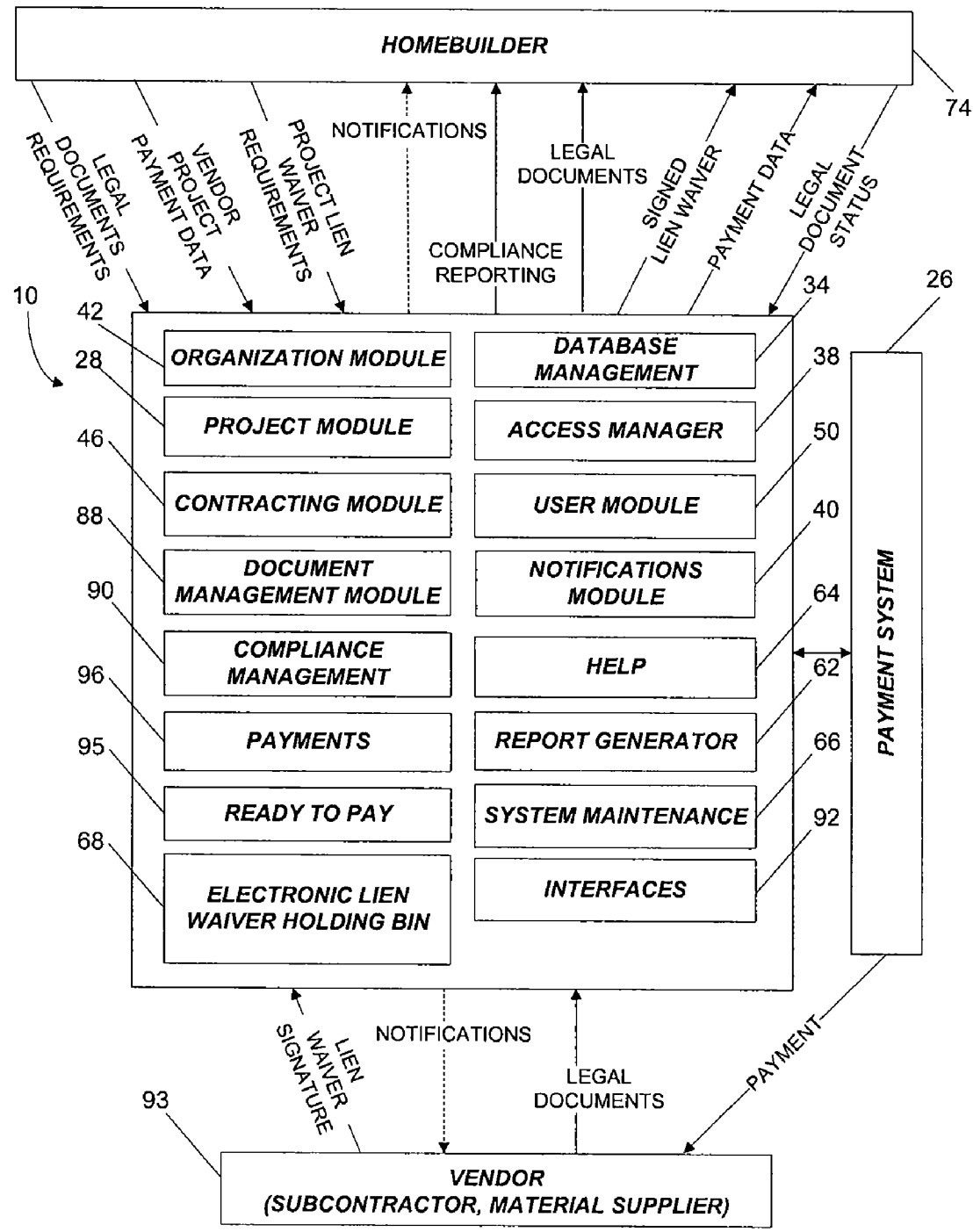
FIG. 3 illustrates a lien waiver exchange workflow of the construction payment management system of FIG. 1 with compliance management.

It should be noted that the CPMS 10 illustrated in FIG. 2 does not include a document management module 88 or a compliance management module 90. Therefore, the CPMS 10 illustrated in FIG. 2 does not provide compliance management. FIG. 3 illustrates a workflow of the CPMS 10 interacting with a homebuilder 74 and one or more vendors 93 wherein the CPMS 10 includes a document management module 88 and a compliance management module 90 and, therefore, provides compliance management. It should be understood that in some embodiments, the CPMS 10 can include a document management module 88 and a compliance management module 90 that can be "turned-on" and "turned-off" in order to optionally provide compliance management as needed or desired.

The CPMS 10 shown in FIG. 3 receives project lien waiver requirements as described above with respect to FIG. 2. The CPMS 10, however, also obtains document requirements from the homebuilder 74. The document requirements can include a list of documents the homebuilder 74 requires from a vendor 93, deadlines for receiving the requested documents, actions to be taken if the requested documents are not received from a particular vendor 93, etc. For example, the homebuilder 74 can specify an enforcement action for a particular requested document. The enforcement action specifies at least one action to be automatically performed by the CPMS 10 if a vendor 93 does not provide a requested document. For example, the enforcement action can include an "Advise Only" action that includes automatically notifying the homebuilder 74 and/or the vendor 93 of a missing document. The enforcement action also can include a "Hold Payment" action that includes automatically holding a payment to a vendor 93 who does not provide a requested document.

The document or compliance requirements can be set at an organization level and/or a project level. In some embodiments, the homebuilder 74 can directly enter the document requirements into the CPMS 10. In other embodiments, the homebuilder 74 can load document requirements to the CPMS 10 via an external system (e.g., an ERP system) using the interfaces module 92 of the CPMS 10. After the homebuilder 74 provides document requirements to the CPMS 10, the vendor 93 can upload the requested documents to the CPMS 10 for approval by the homebuilder 74.

After the homebuilder 74 provides the lien waiver and document requirements, the homebuilder 74 can provide the CPMS 10 with vendor project payment data via the interfaces module 92 as described above with respect to FIG. 2. After the homebuilder 74 enters the payment data into the CPMS 10, the CPMS 10 prompts the vendor 93 (e.g., via a notification) to electronically sign a lien waiver and, once the vendor 93 signs the lien waiver, stores the lien waiver in the electronic holding bin 68. At this point in the lien waiver and payment exchange process, the CPMS 10 can also prompt the vendors 93 to enter any missing compliance documents that are required before a vendor can receive a payment. In comparison to the exchange process described above with respect to FIG. 2, if the vendor 93 is noncompliant with the required documents and the homebuilder 74 has selected to hold payments when a vendor 93 is deemed noncompliant, the payment for the vendor is not automatically generated even if the vendor 93 signs the requested lien waiver.

When a vendor 93 is compliant with the required documents, the homebuilder 74 updates the status of the compliance requirements associated with the vendor 93 and releases any held payments. A payment is then queued for execution, as described above with respect to FIG. 2. Once the payment is ready to execute, the CPMS 10 initiates a payment to the vendor 93 (e.g., via ACH). The CPMS 10 also allows the homebuilder 74 to access the signed lien waiver. In some embodiments, however, the CPMS 10 prevents the homebuilder 74 from viewing the signature on the lien waiver until payment to the vendor 93 is confirmed. Once the payment is confirmed, the CPMS 10 provides a receipt of payment (e.g., via a notification) to the vendor 93. In addition, the CPMS 10 can create a payment record for the homebuilder 74, as described above with respect to FIG. 2.

Figure 4:
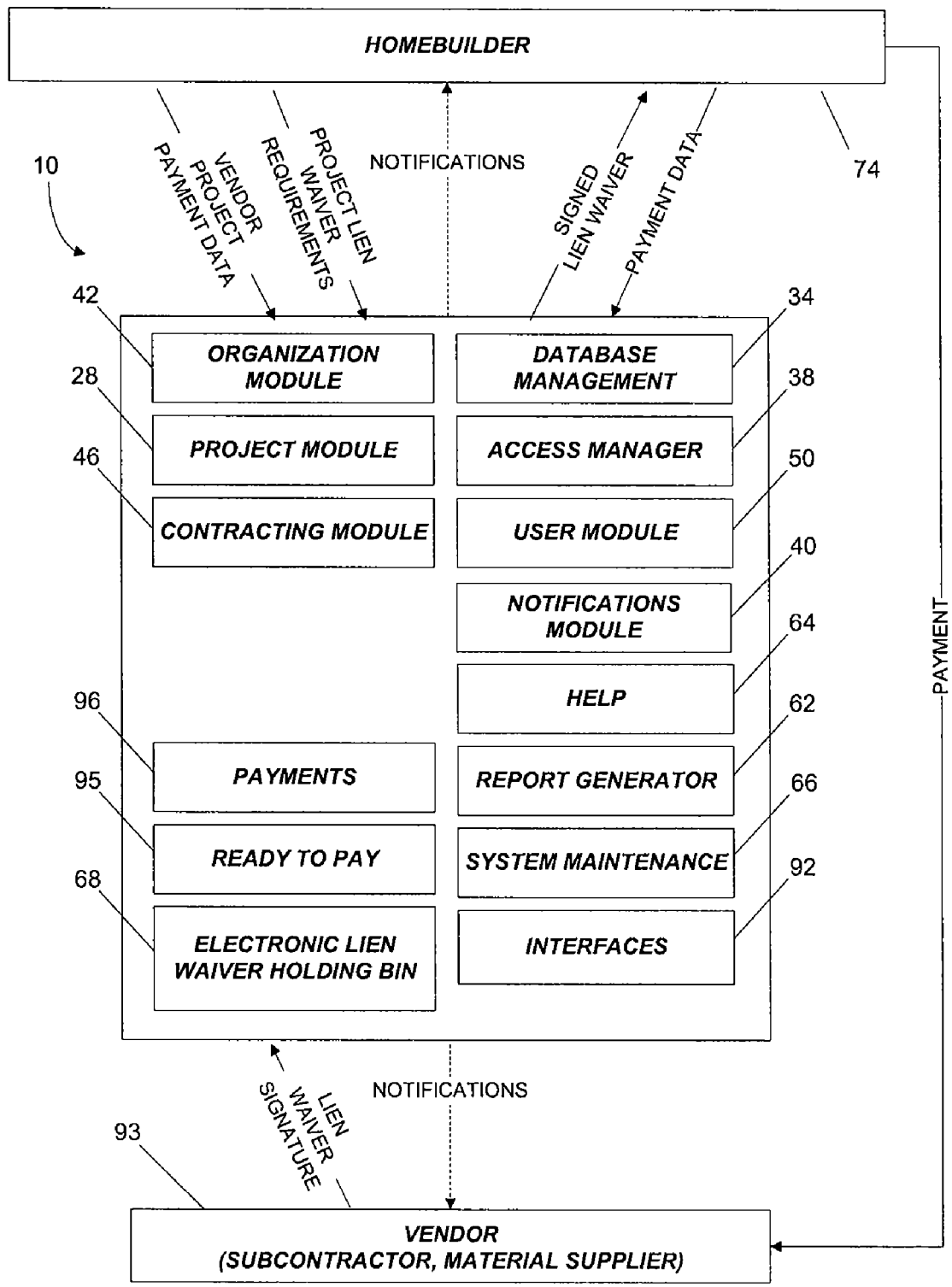
FIG. 4 illustrates a lien waiver exchange workflow of the construction payment management system of FIG. 1 without compliance management and without automated electronic payment.
Figure 5:
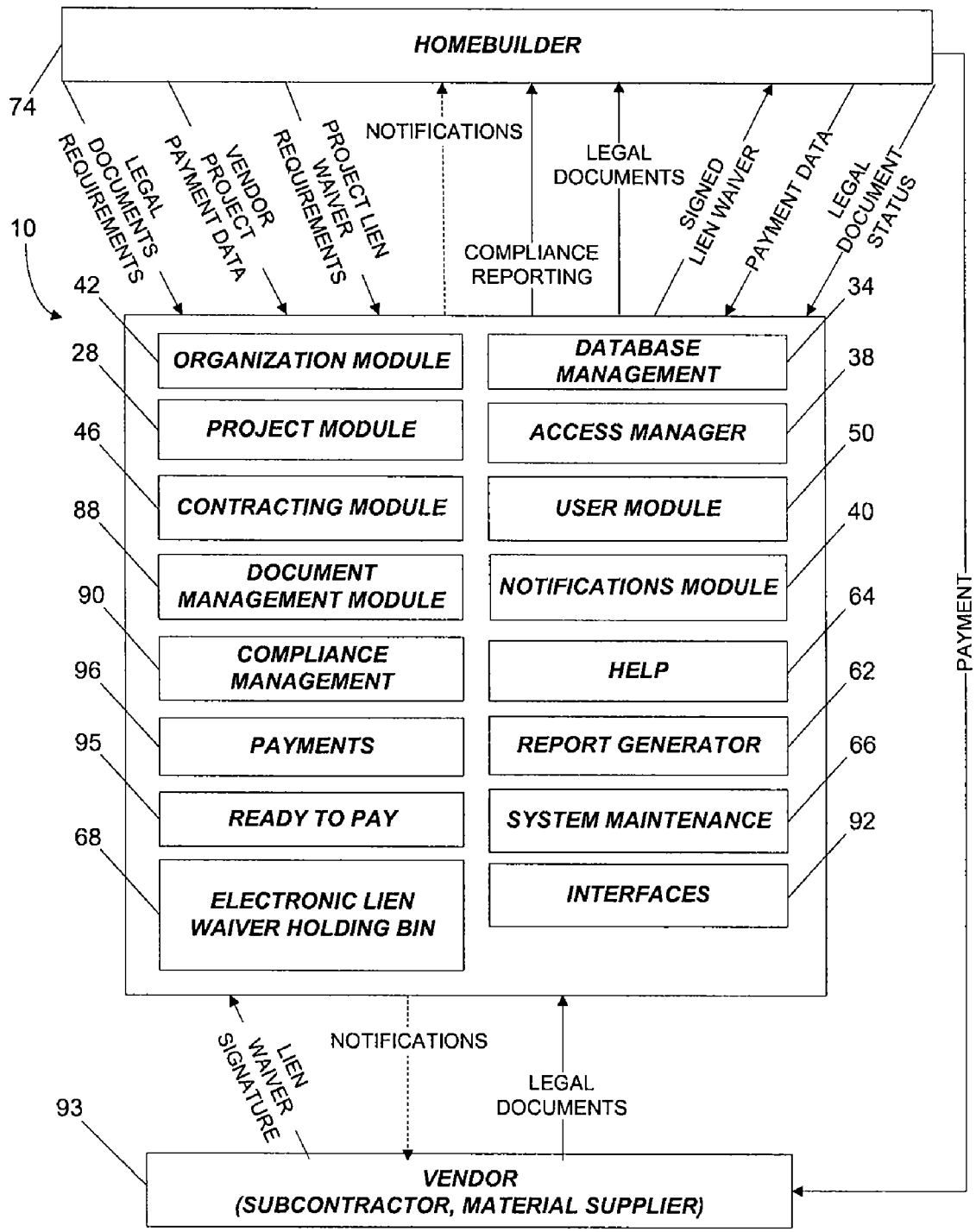
FIG. 5 illustrates a lien waiver exchange workflow of the construction payment management system of FIG. 1 with compliance management and without automated electronic payment.

In additional embodiments, various aspects of the workflow illustrated in FIGS. 2 and 3 may be modified or removed depending upon the particular needs of the builder 74 and the construction project. For example, FIGS. 4 and 5 illustrate lien waiver exchange workflows wherein the CPMS 10 is not directly connected to a payment system 26. Instead, builder 74 is notified by the system that a lien waiver has been stored in the electronic holding bin 68. Builder 74 then effectuates payment manually—for example, by writing a check and physically delivering it to the vendor. Builder 74 indicates to the CPMS 10 that payment has been made and CPMS 10 proceeds as illustrated above in FIG. 2 or 3.

Figure 6:
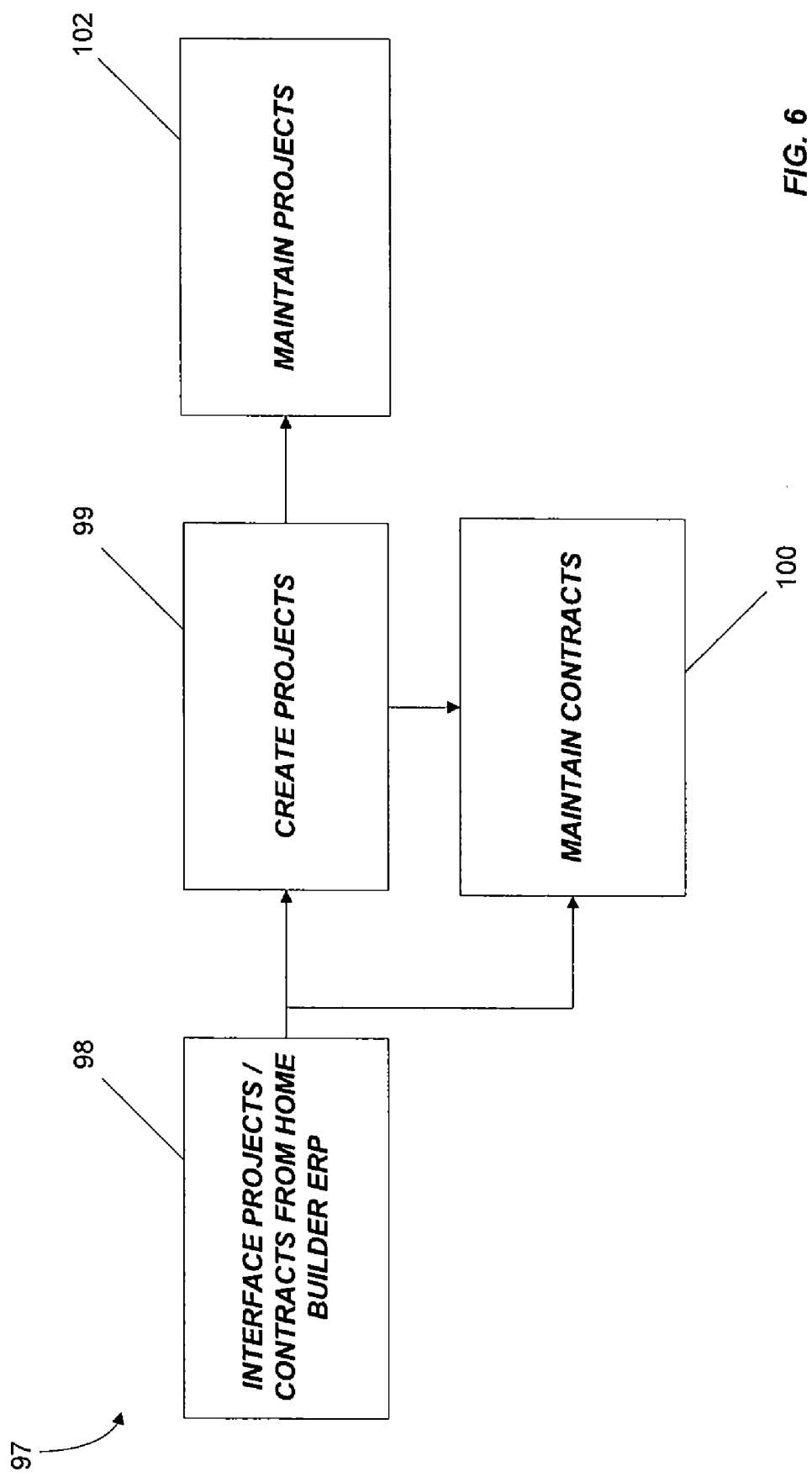
FIG. 6 is a schematic illustration of a manage project process.

FIGS. 6-39 illustrate an overview of the construction payment management processes that can be performed by the participants 24 using the various modules, managers, and engines stored in the application server 12. FIG. 6 illustrates a manage project process 97, which includes an interface project/contract process 98, a create projects process 99, a maintain contracts process 100, and a maintain projects process 102.

Figure 7:
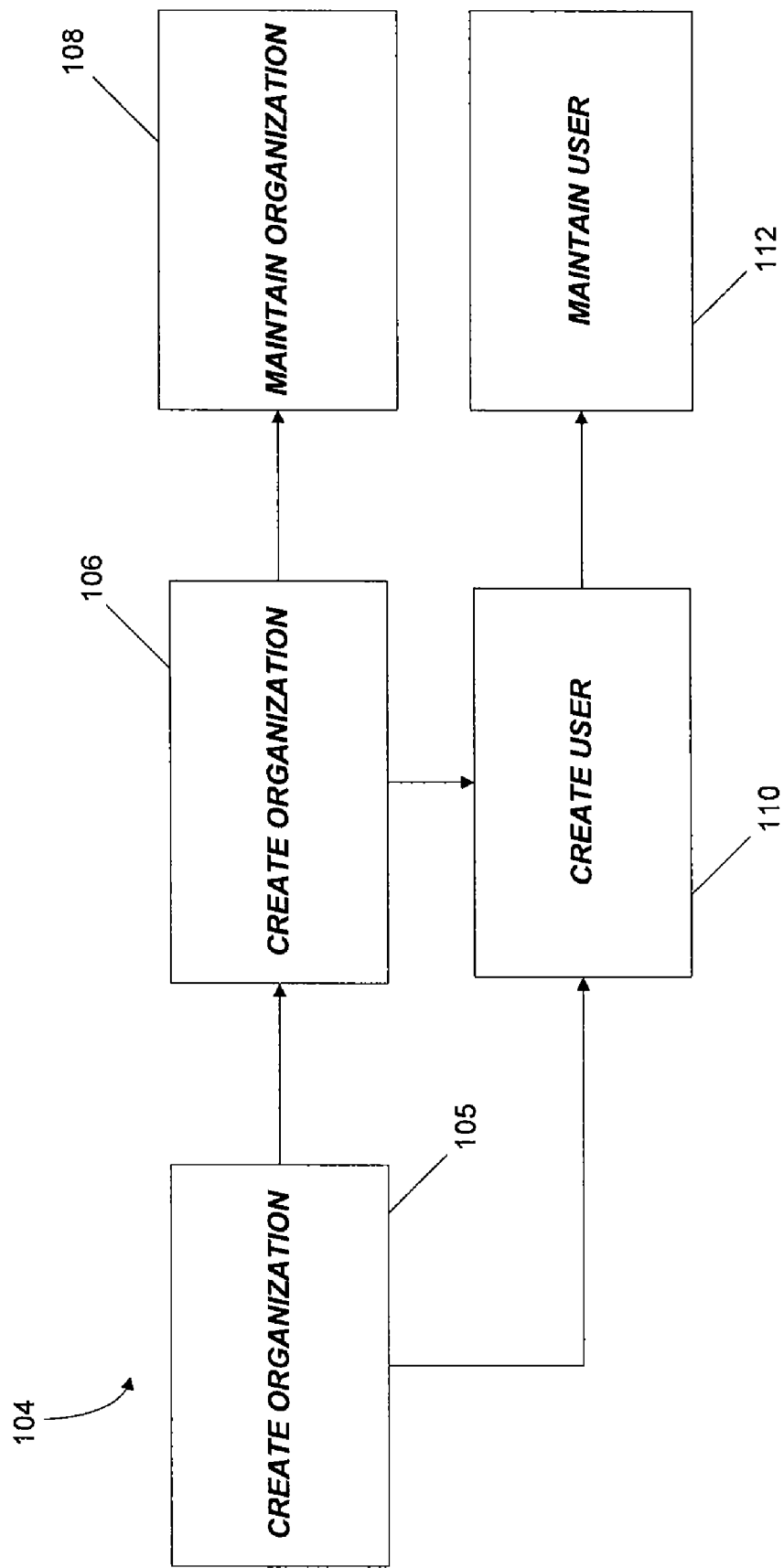
FIG. 7 is a schematic illustration of a manage organization process.

FIG. 7 illustrates a manage organization process 104 (which can be performed by the organization module 42 and/or the user module 50) which includes an invite organization/user process 105, a create organization process 106, a maintain organization process 108, a create user process 110, and a maintain user process 112.

Figure 8:
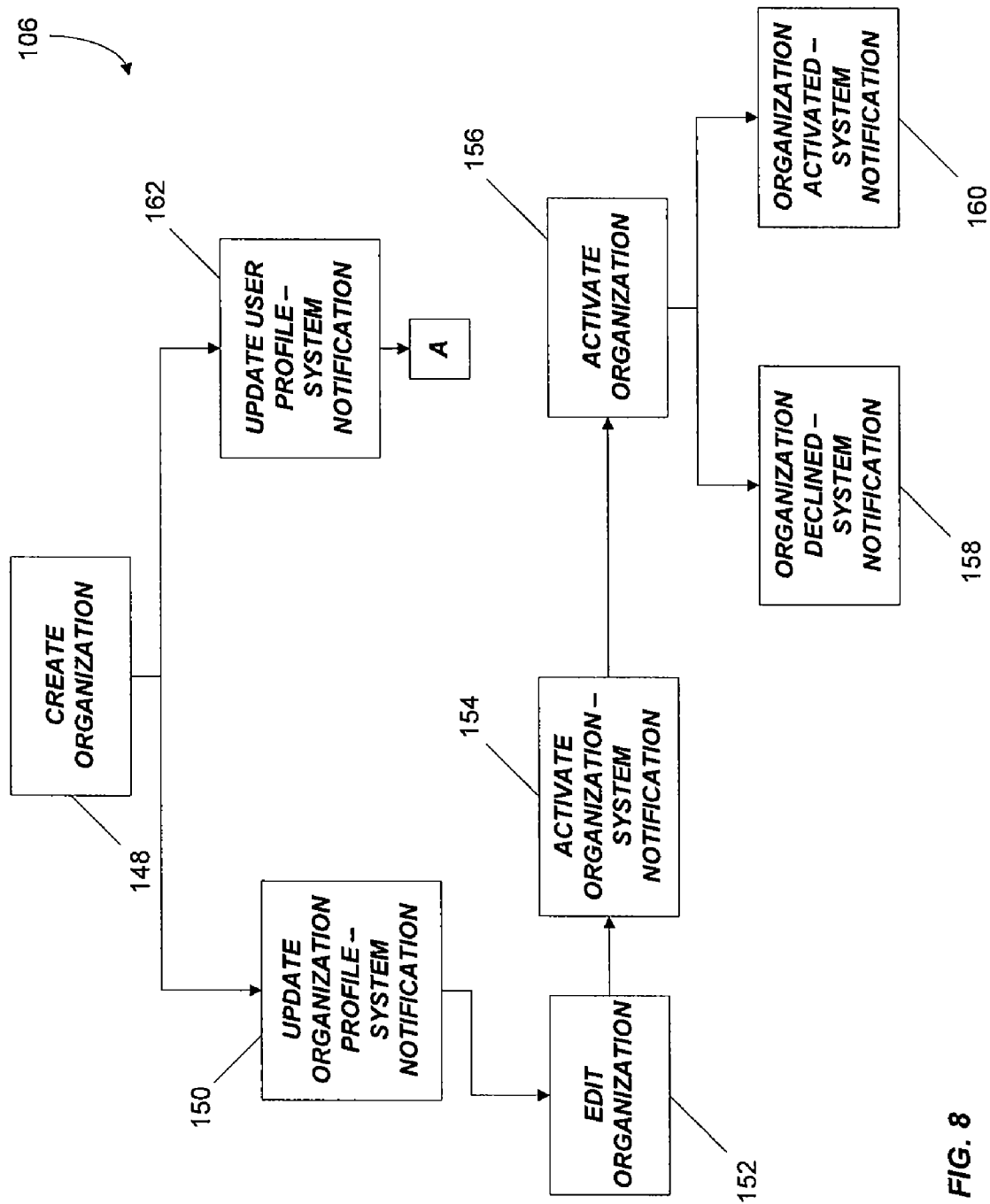
FIG. 8 is a schematic illustration of a create organization and/or user process.

FIG. 8 illustrates the create organization process 106, which can be included in the manage organization process 104. The create organization process 106 can be performed by any of the participants 24 using the organization module 42. The create organization process 106 includes a create organization task 148, an update organization profile task 150, an edit organization task 152, and an activate organization task 156. An update user profile task 162 can also be performed, as further described with respect to FIG. 22.

Figure 9:
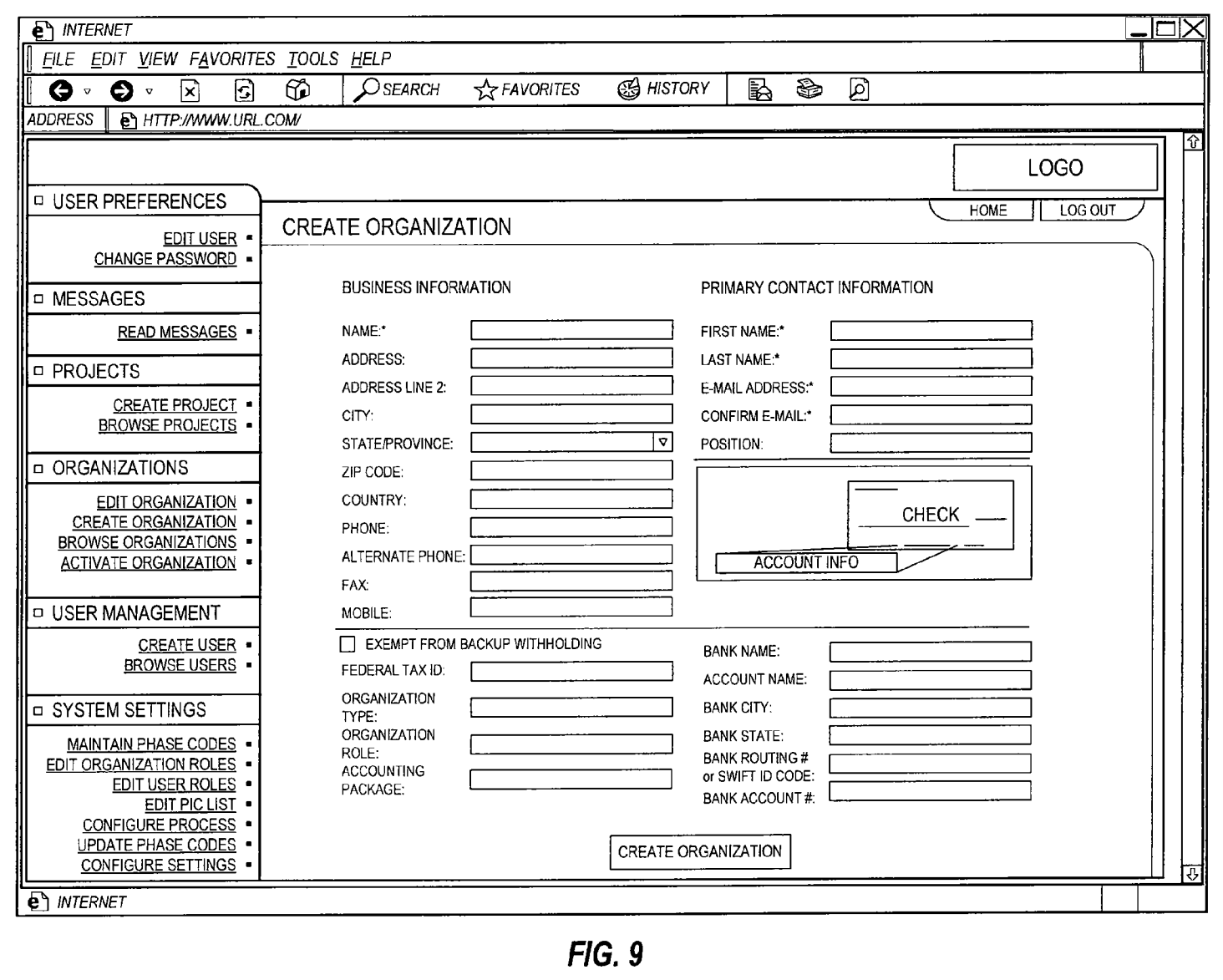

FIG. 9 illustrates a create organization form that can be associated with the create organization task 148. One or more of the participants 24 can access the create organization form through the organization module 42. The participant 24 can then enter the requested information, such as business information, primary contact information, tax information, and banking information. For example, the participant 24 can enter an organization or company name, address, city, state, zip code, county, bank account number, bank routing number, and federal employer identification number (FEIN). The participant 24 can also enter user information associated with the organization, such as user name (first and last), title, email address, and phone number. In some embodiments, the first user of the participating organization 24 that enters his or her personal information as the user information associated with the organization can be deemed an administrator for that participant 24 and can be given more access to the information for the participant than subsequent users. The CPMS 10 can use comprehensive role-based security so that project participants only see information tailored to their specific needs in the project. In some embodiments, once an organization is registered in the CPMS 10, the organization can receive payments for any projects managed by the CPMS 10.

Figure 10:
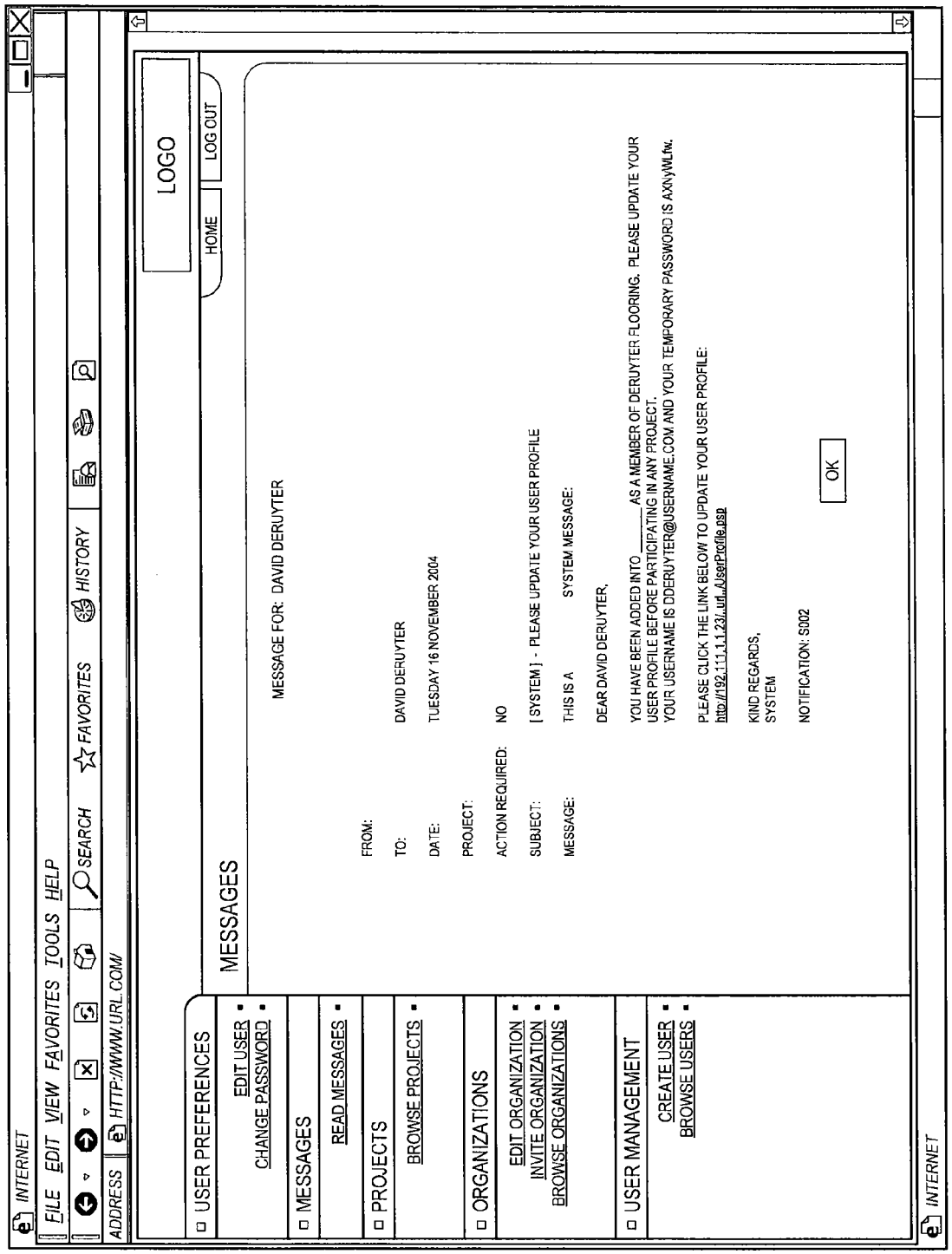
FIG. 10 is an illustration of a new user system notification.

FIG. 10 illustrates a notification that can be transmitted during the update user profile task 162. Unless explicitly stated otherwise, the terms "system notification," "notification," or "system message" as used herein and in the appended claims refer to any form of communication with a participant 24, such as an email message, a screen notice, a text message, a voice message, etc. The system notification of FIG. 8 includes a username and a temporary password for the first user of the participant 24.

Figure 11:
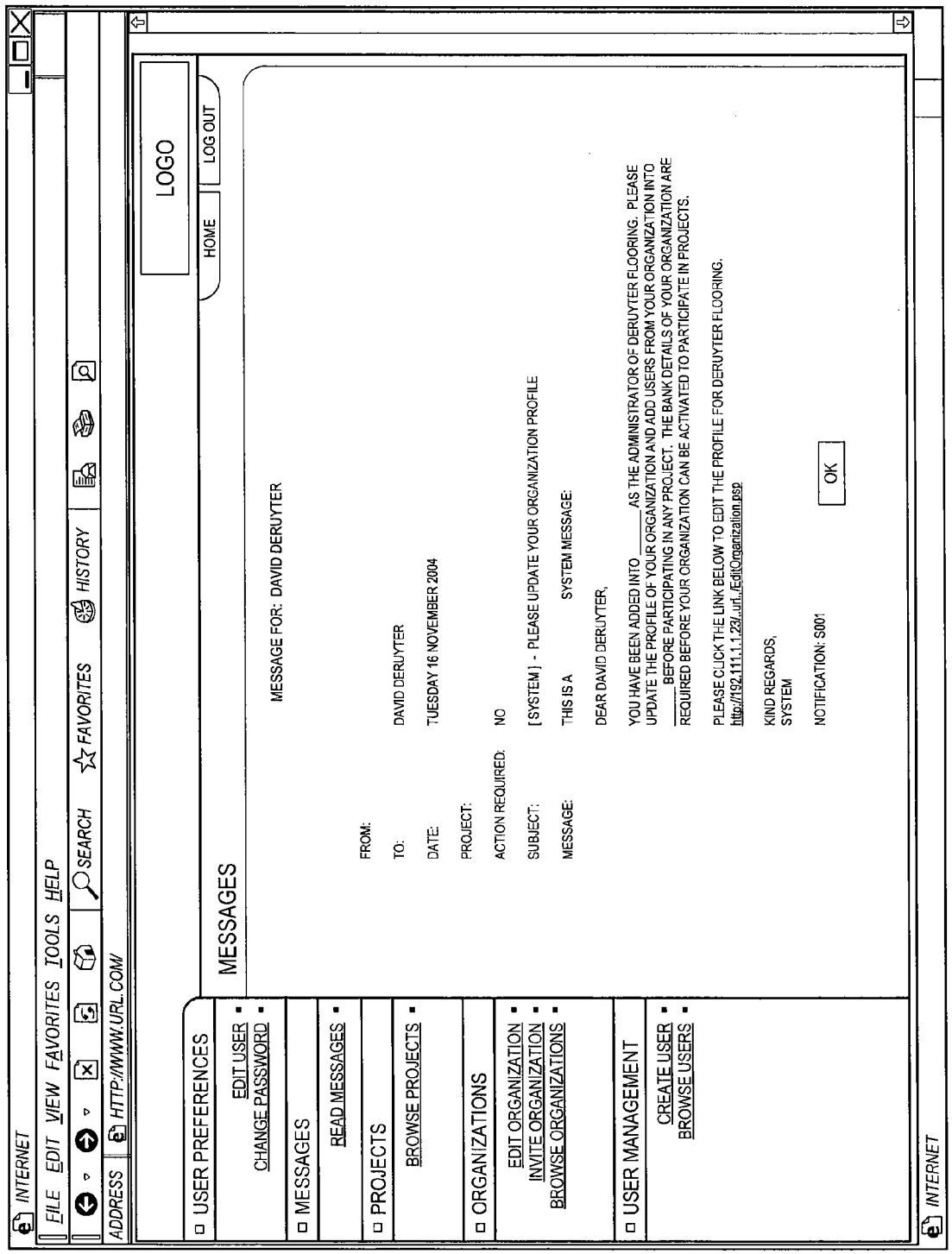
FIG. 11 is an illustration of a system notification.

FIG. 11 illustrates a notification that can be transmitted during the update organization profile task 150. The notification of FIG. 11 can be sent to the administrator for the participant 24. The notification includes a statement requesting the recipient to update the organization profile, add users before participating in a project, and provide bank details.

Figure 12:
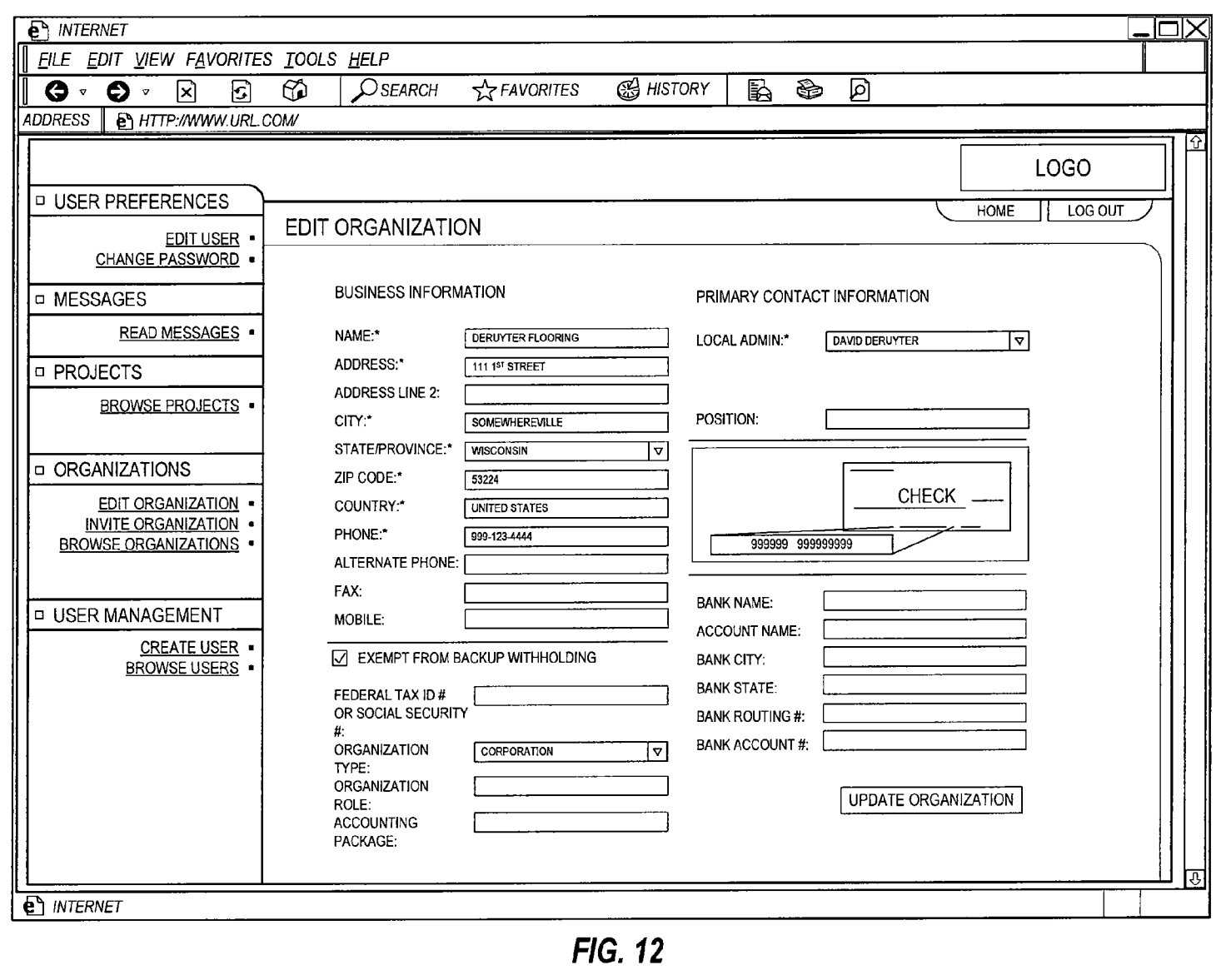

FIG. 12 illustrates an edit organization form that can be associated with the edit organization task 152. Each participant 24 can access the edit organization form through the organization module 42. The participant 24 can modify the existing information, such as business information, primary contact information, tax information, and banking information. In some embodiments, the first user of the participating organization 24 that entered his or her information as user information associated with the organization is the only user given access to the edit organization form.

Figure 13:
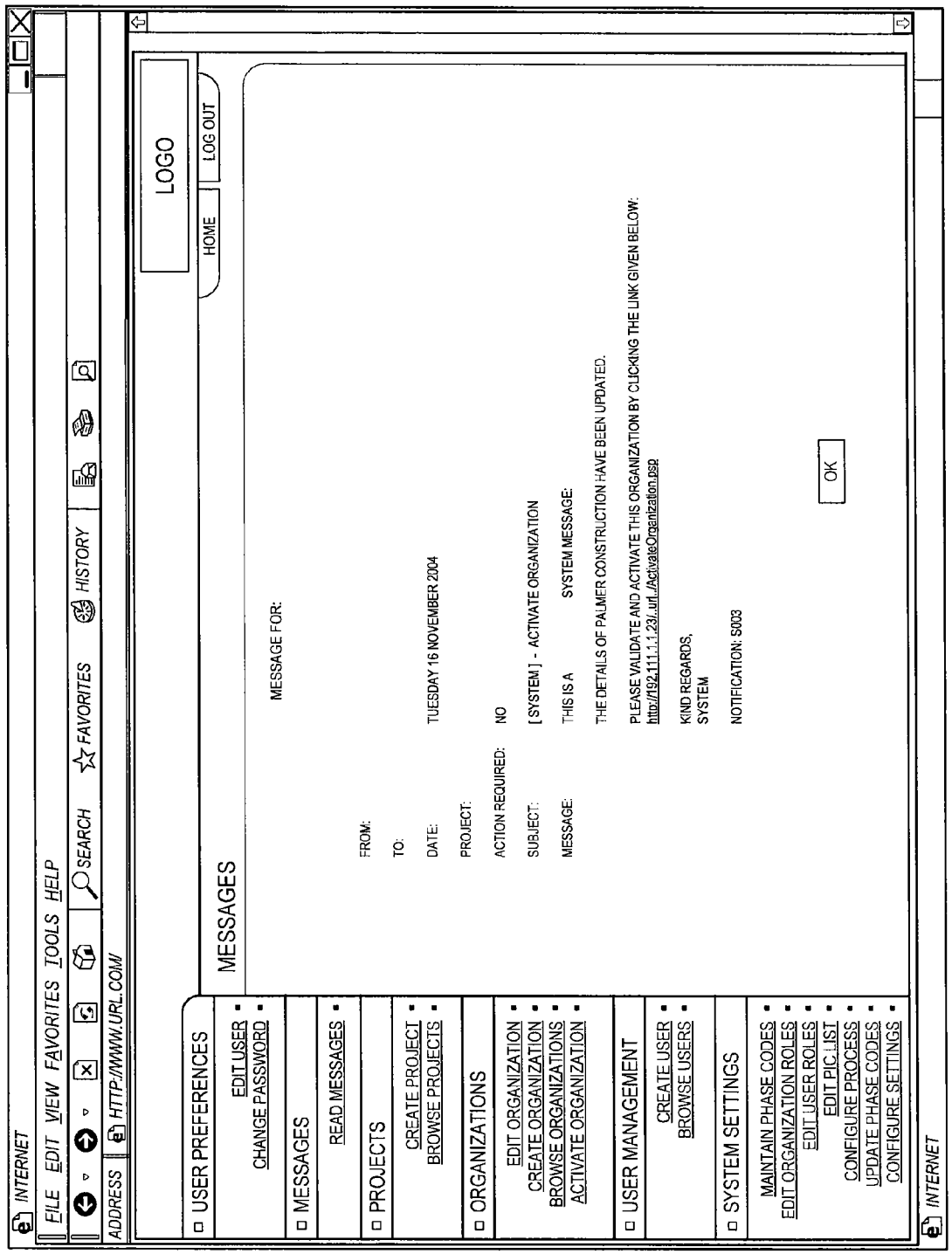
FIG. 13 is an illustration of an activate organization notification.

FIG. 13 illustrates an activate organization notification that can be transmitted during the activate organization notification task 156. The notification of FIG. 13 includes a statement that the details of the organization have been updated and a request that the organization be validated and activated.

Figure 14:
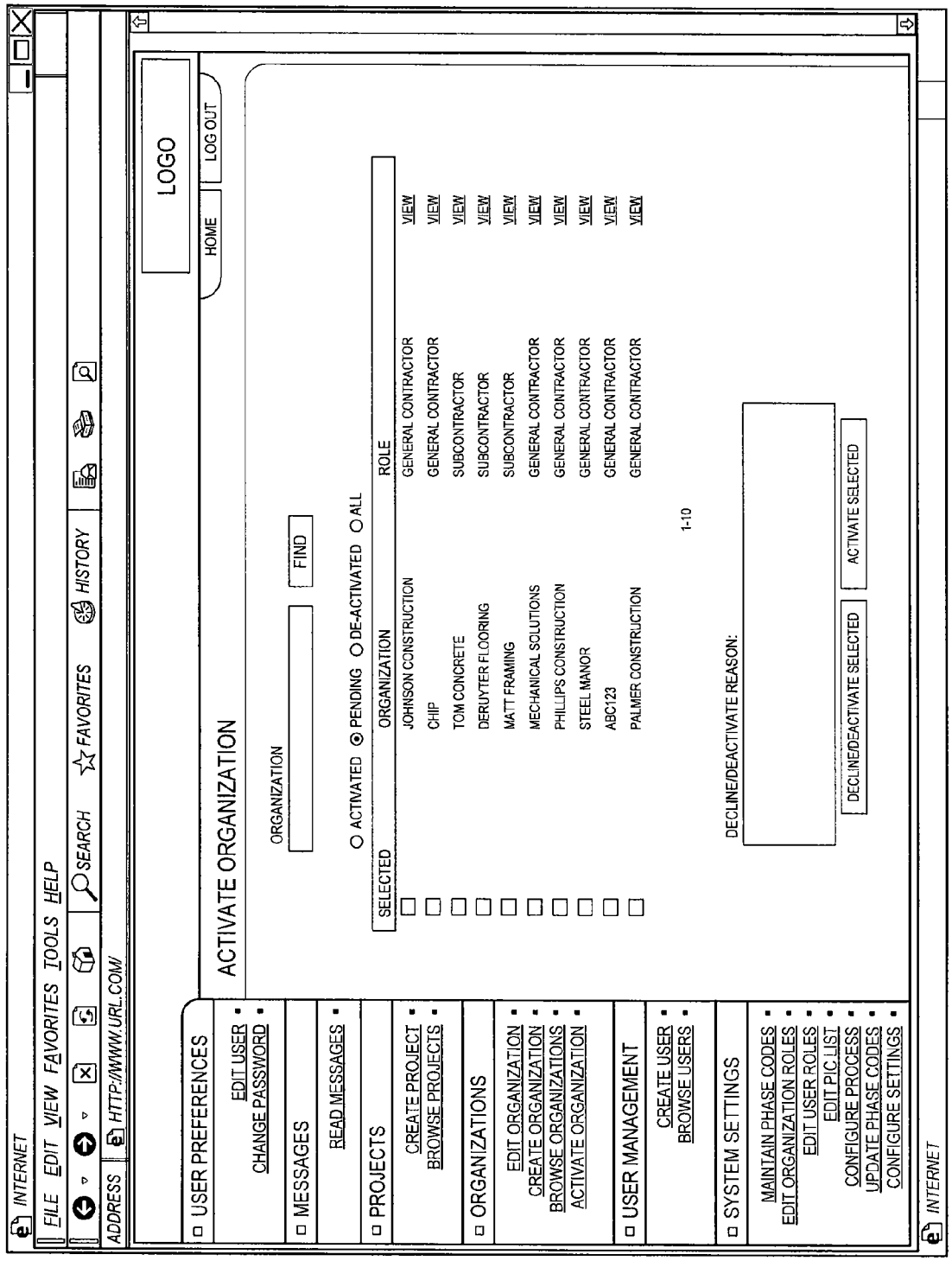
FIG. 14 is an illustration of an activate organization form.

FIG. 14 illustrates an activate organization form that can be associated with the activate organization task 156. The form of FIG. 14 includes a listing of participants 24 (e.g., including the organization name, its role in the construction process, the ability to select participants 24, and the ability to view information for the participants 24). The form of FIG. 14 also includes a "Find" feature, the ability to specify the type of participant 24, and the ability to decline/deactivate selected organizations and to provide a reason for the decline/deactivation.

Figure 15:
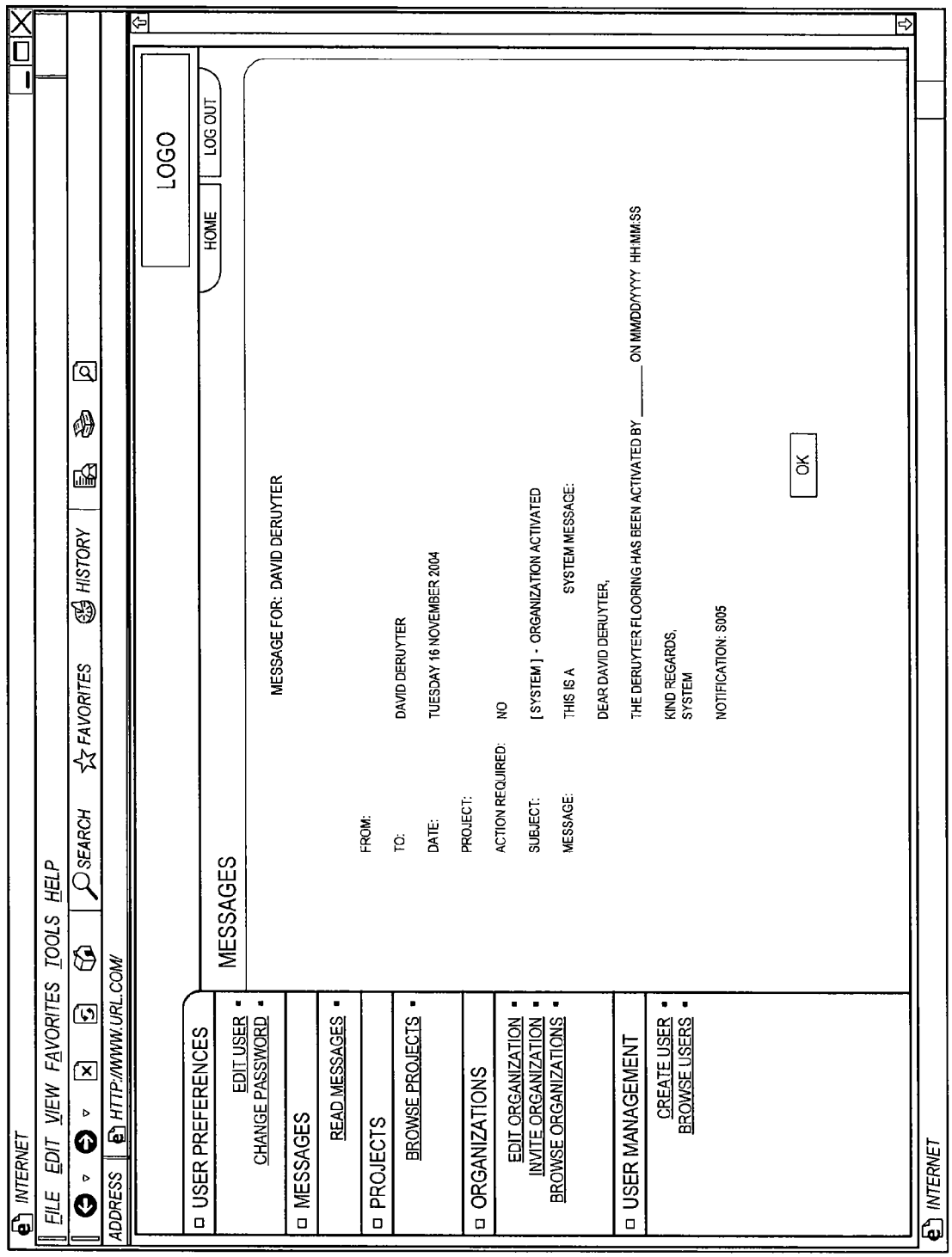
FIG. 15 is an illustration of an organization activated notification.
Figure 16:
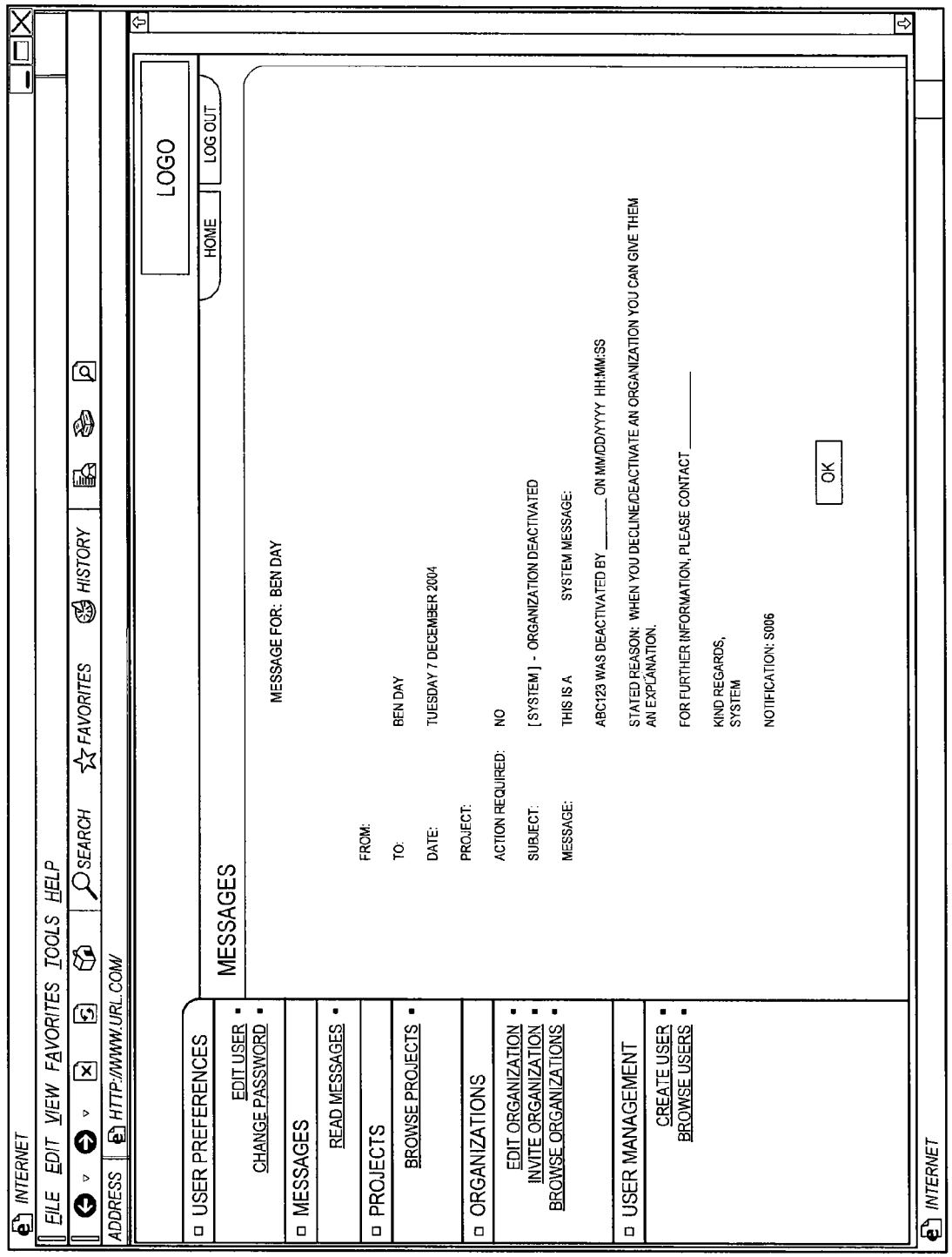
FIG. 16 is an illustration of an organization deactivated notification.

FIG. 15 illustrates an organization activated notification that can be transmitted during the organization activated task 160. Similarly, FIG. 16 illustrates an organization deactivated notification that can be transmitted during the organization declined task 158.

Figure 17:
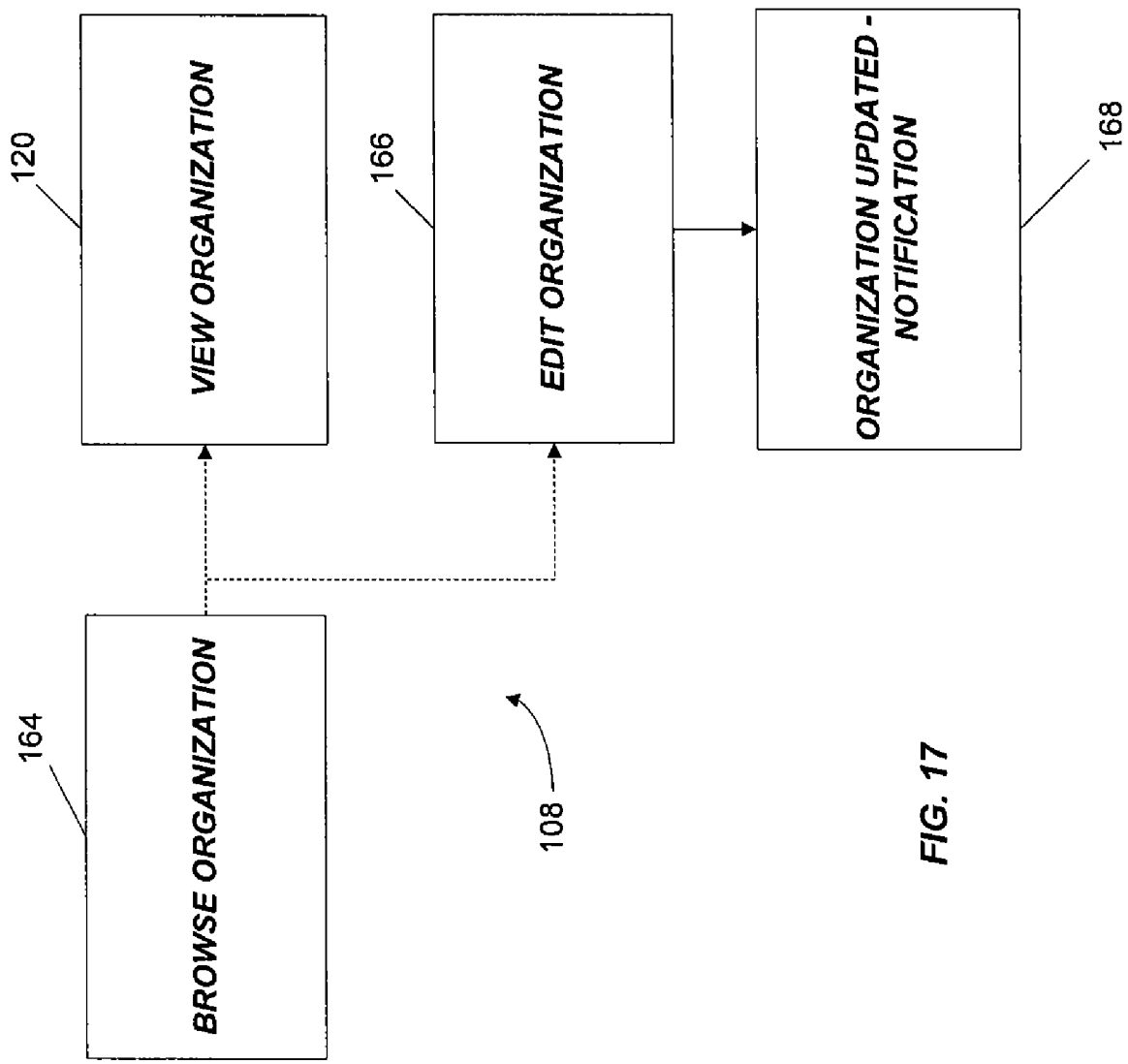
FIG. 17 is a schematic illustration of a maintain organization process.

FIG. 17 illustrates a maintain organization process 108, which can be included in the manage organization process 104. The maintain organization process 108 can be used by the organizations themselves or by other participants to maintain the accuracy of the contact information, bank account information, or any other type of information necessary for the construction payment process. The maintain organization process 108 can be performed by the participants using the organization module 42. The maintain organization process 108 of FIG. 17 includes a browse organization task 164, an edit organization task 166, an organization updated notification task 168, and a view organization task 120.

Figure 18:
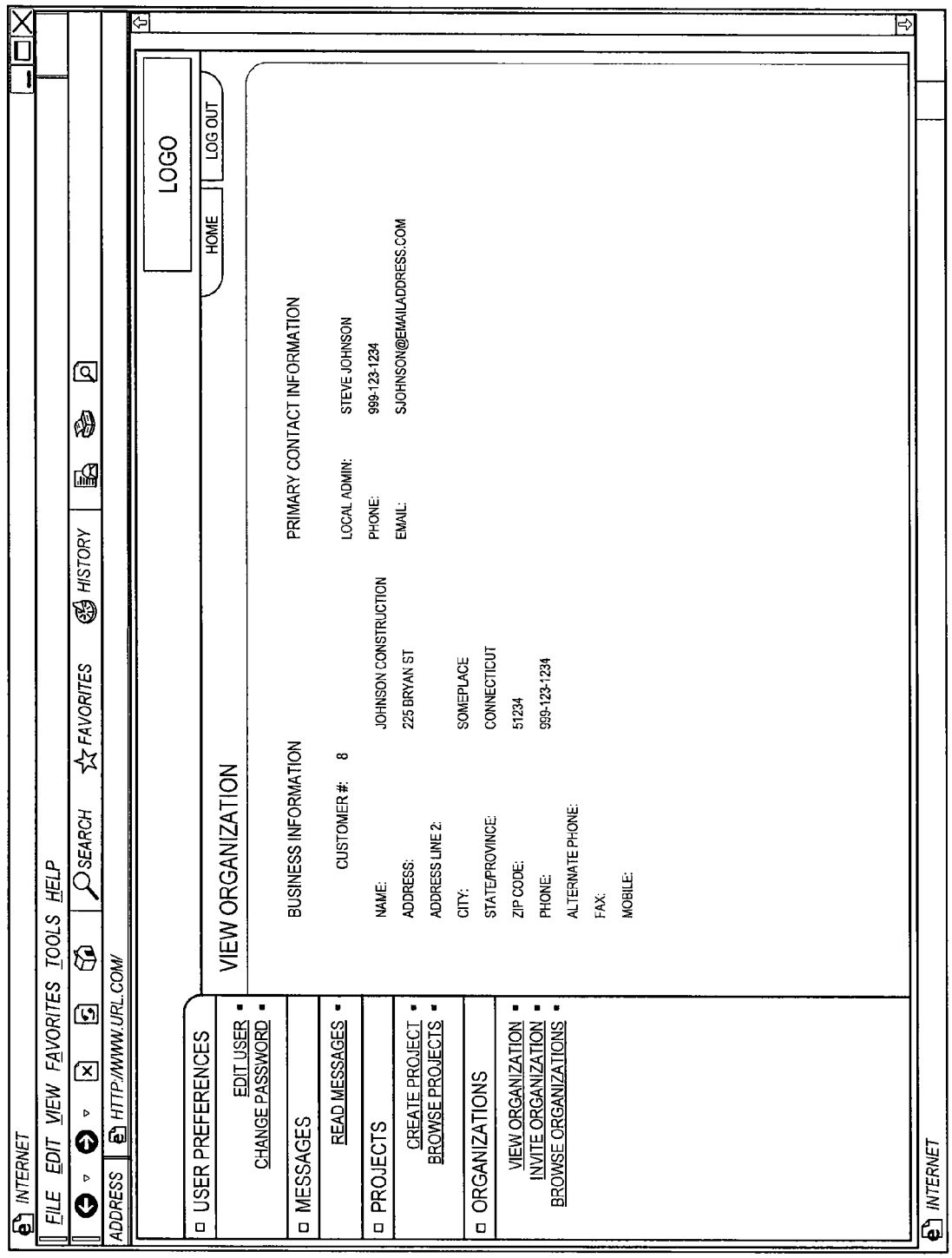
FIG. 18 is an illustration of a view organization screen.

FIG. 18 illustrates a view organization screen that can be associated with the view organization task 120. The view organization screen includes business information and primary contact information for an organization.

Figure 19:
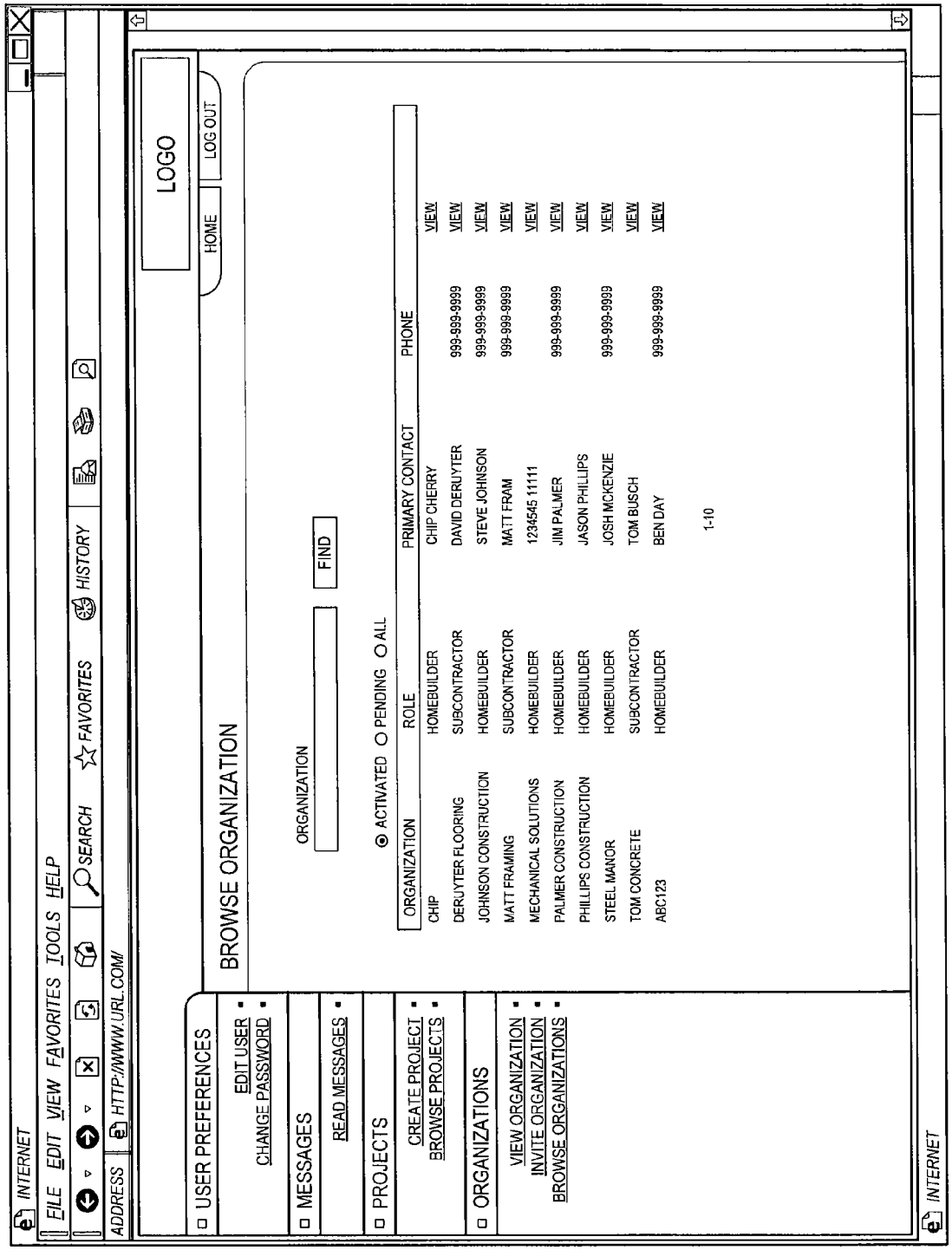
FIG. 19 is an illustration of a browse organization screen.

FIG. 19 illustrates a browse organization screen that can be associated with the browse organization task 164. The browse organization screen includes a list of participants, including the organization name, the organization role in the construction process, the primary contact, and the phone number. The browse organization screen also includes a "Find" feature and links for viewing additional information about each participant. In some embodiments, the browse organization screen can be used by a homebuilder to view its preferred subcontractors or material suppliers.

Figure 20:
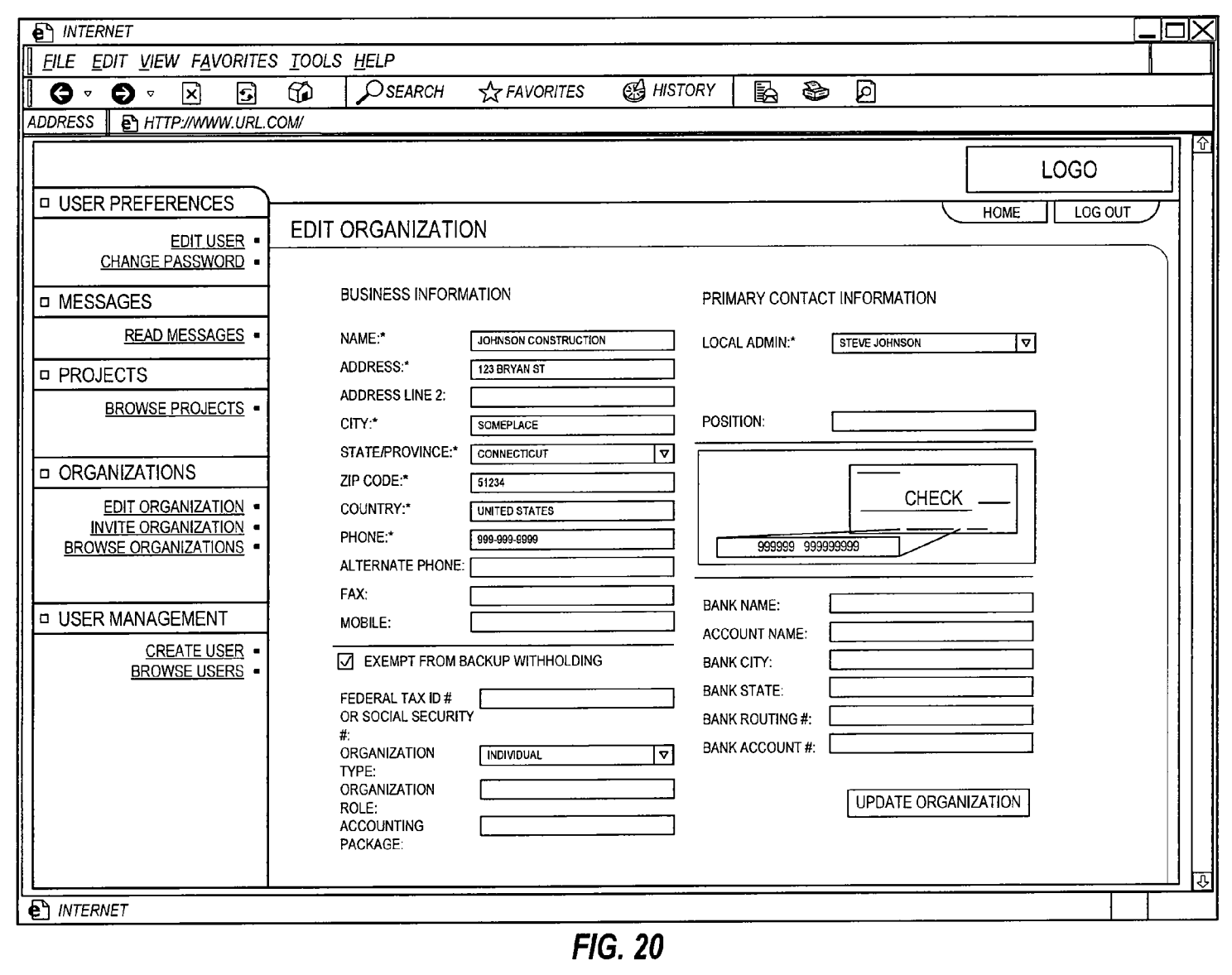

FIG. 20 illustrates an edit organization form that can be associated with the edit organization task 166. The participant can edit the existing information, such as business information, primary contact information, tax information, and banking information. In some embodiments, the first user of the organization that entered his or her information as the primary contact information is the only user given access to the edit organization form.

Figure 21:
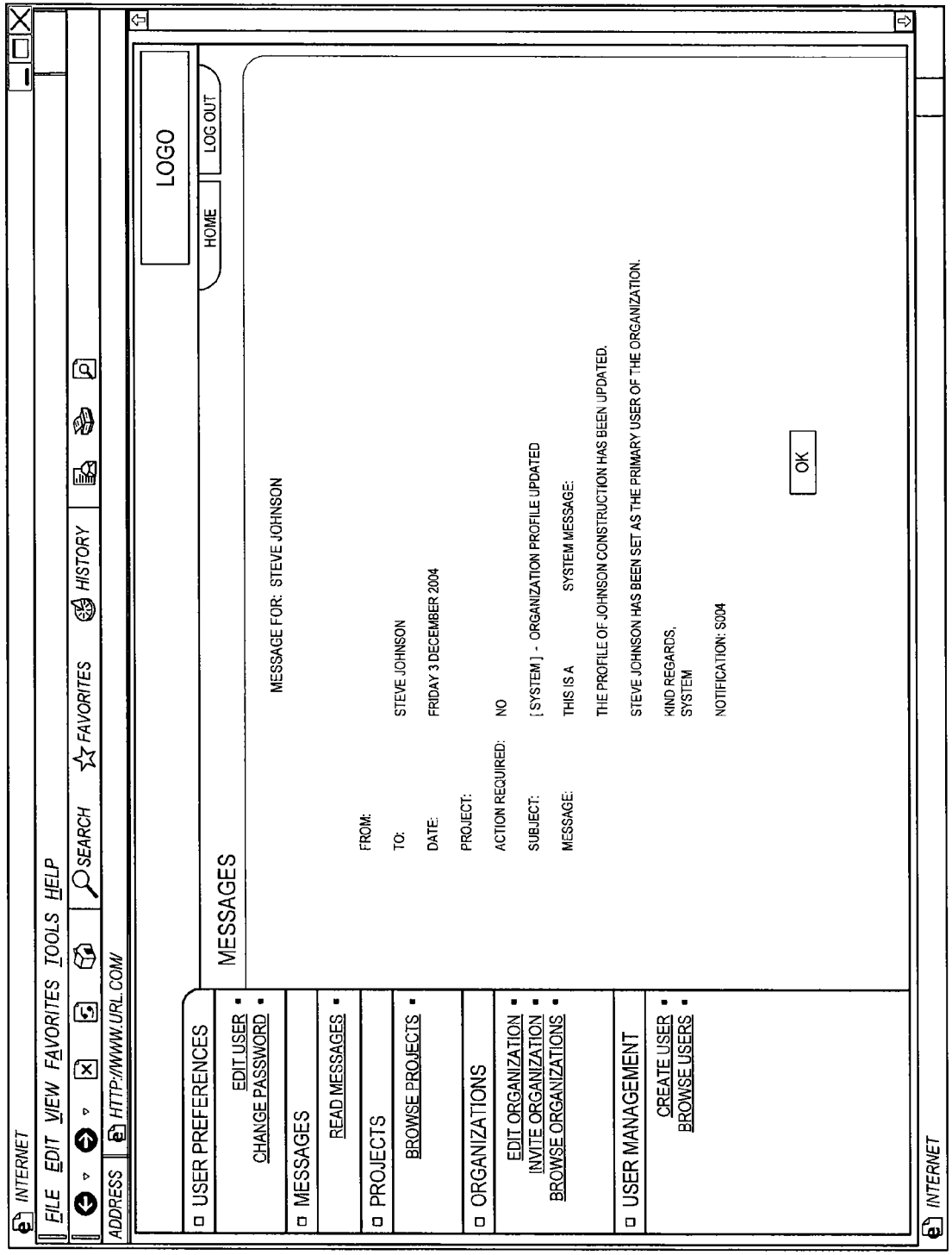
FIG. 21 is an illustration of an organization profile updated notification.

FIG. 21 illustrates an organization profile updated notification that can be transmitted during the organization updated notification task 168. The notification of FIG. 21 includes information regarding the updated profile for the participant along with a name of the primary user or administrator for the participant.

Figure 22:
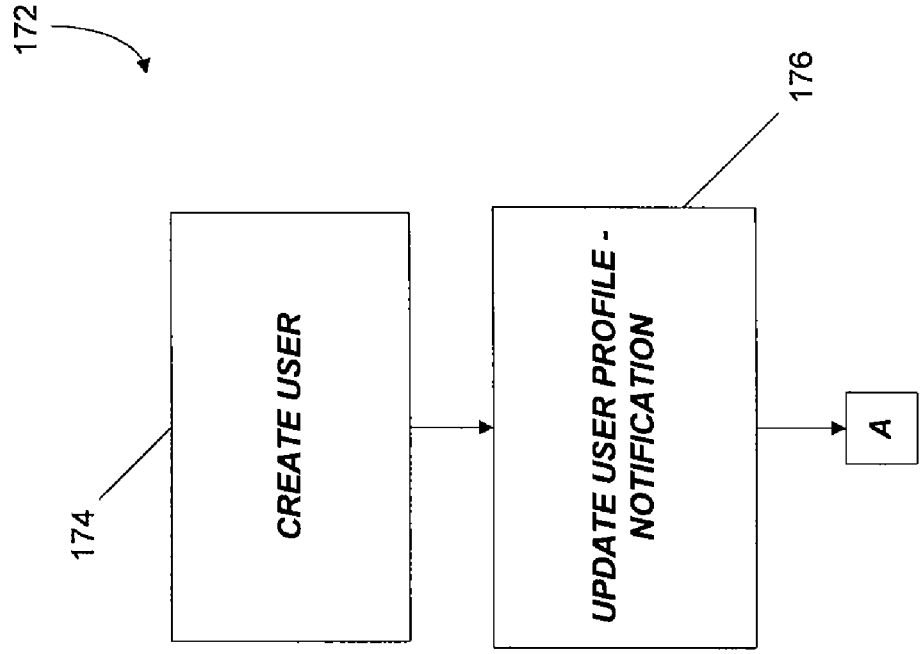
FIG. 22 is a schematic illustration of a create user process.

FIG. 22 illustrates a create user process 172, which can be included in the manage organization process 104. The create user process 172 can be used each time a new user at an existing organization is created in order to give the new user the appropriate access to the CPMS 10 (e.g., the appropriate security levels with a user identification and password). The create user process 172 can also be used to update user profiles. The create user process 172 can be performed by any of the participants 24 using the organization module 42. The create user process 172 of FIG. 22 includes a create user task 174 and an update user profile notification task 176.

Figure 23:
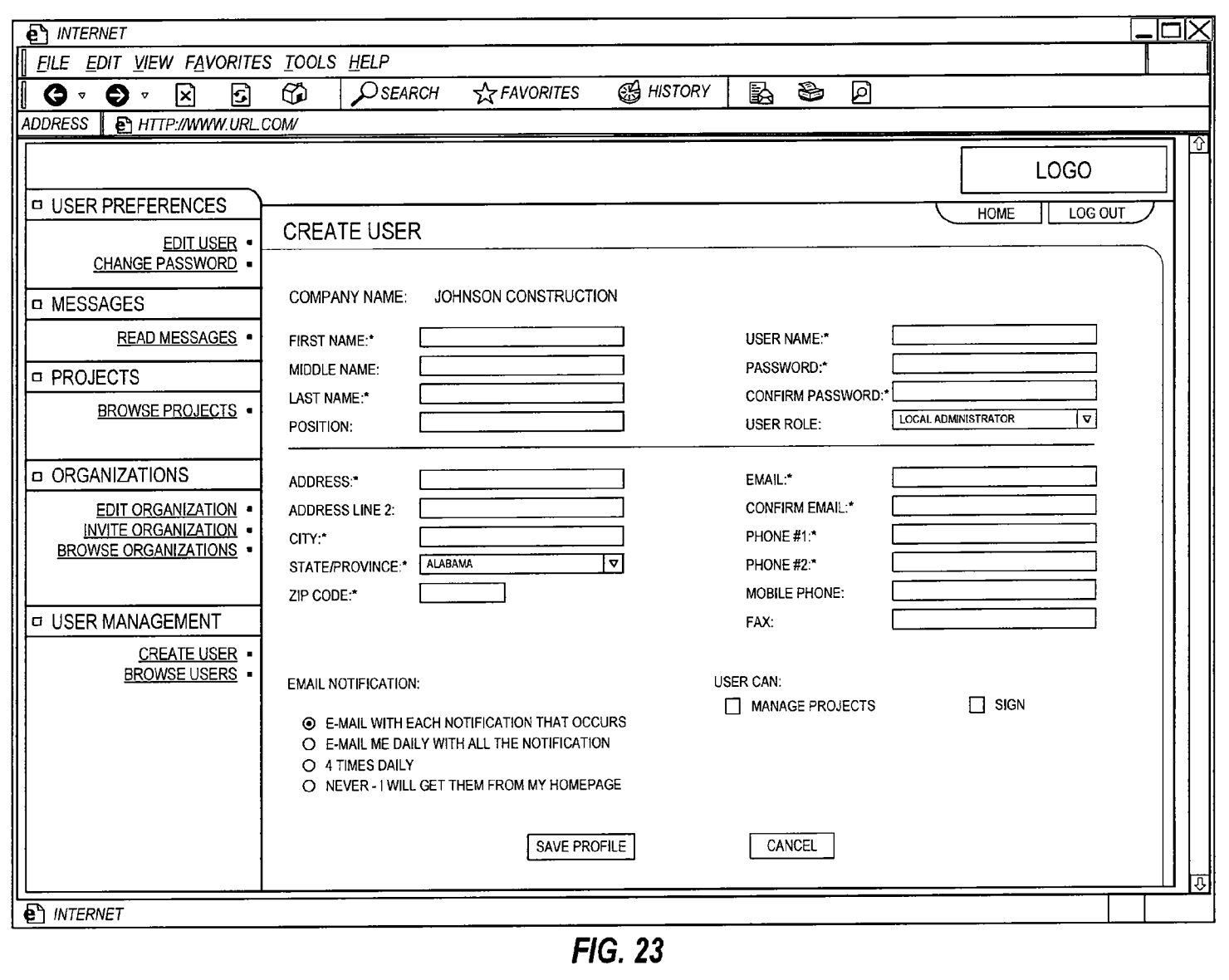

FIG. 23 illustrates a create user form that can be associated with the create user task 174. In some embodiments, the create user form can be used to add users after the primary user or administrator has already been created for the participant. The new user can enter personal information, security information (e.g., user name and password), email notification preferences, and security clearance levels (e.g., whether the user can manage projects and/or sign documents). For example, a new user can enter a user name (e.g., first and last name), a title, an email address, and a phone number.

Figure 24:
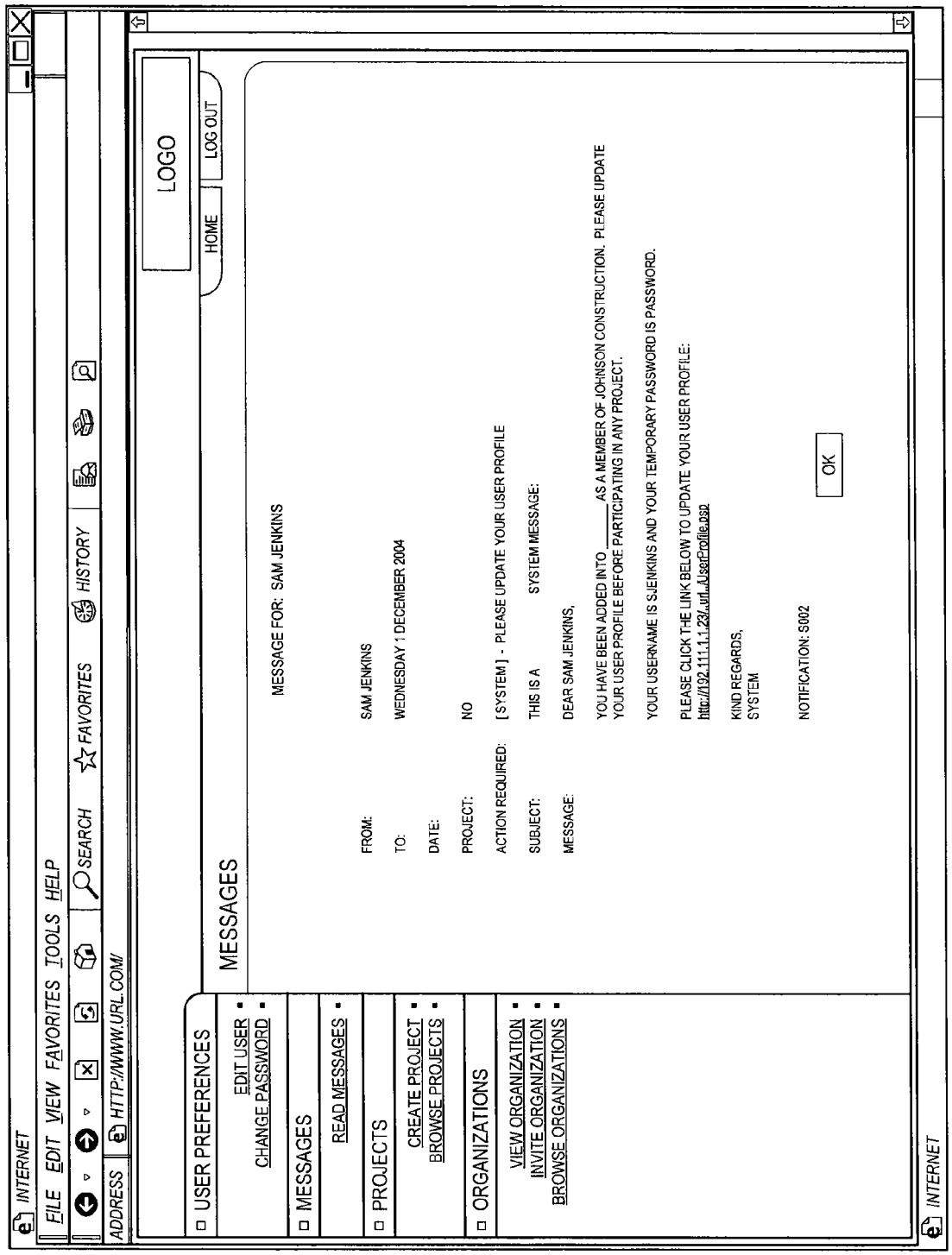
FIG. 24 is an illustration of an update user profile notification.

FIG. 24 illustrates an update user profile notification that can be transmitted during the update user profile notification task 176. The notification of FIG. 24 includes a statement that the user has been added as a member of the organization, along with the user's security information (e.g., user name and a temporary password).

Figure 25:
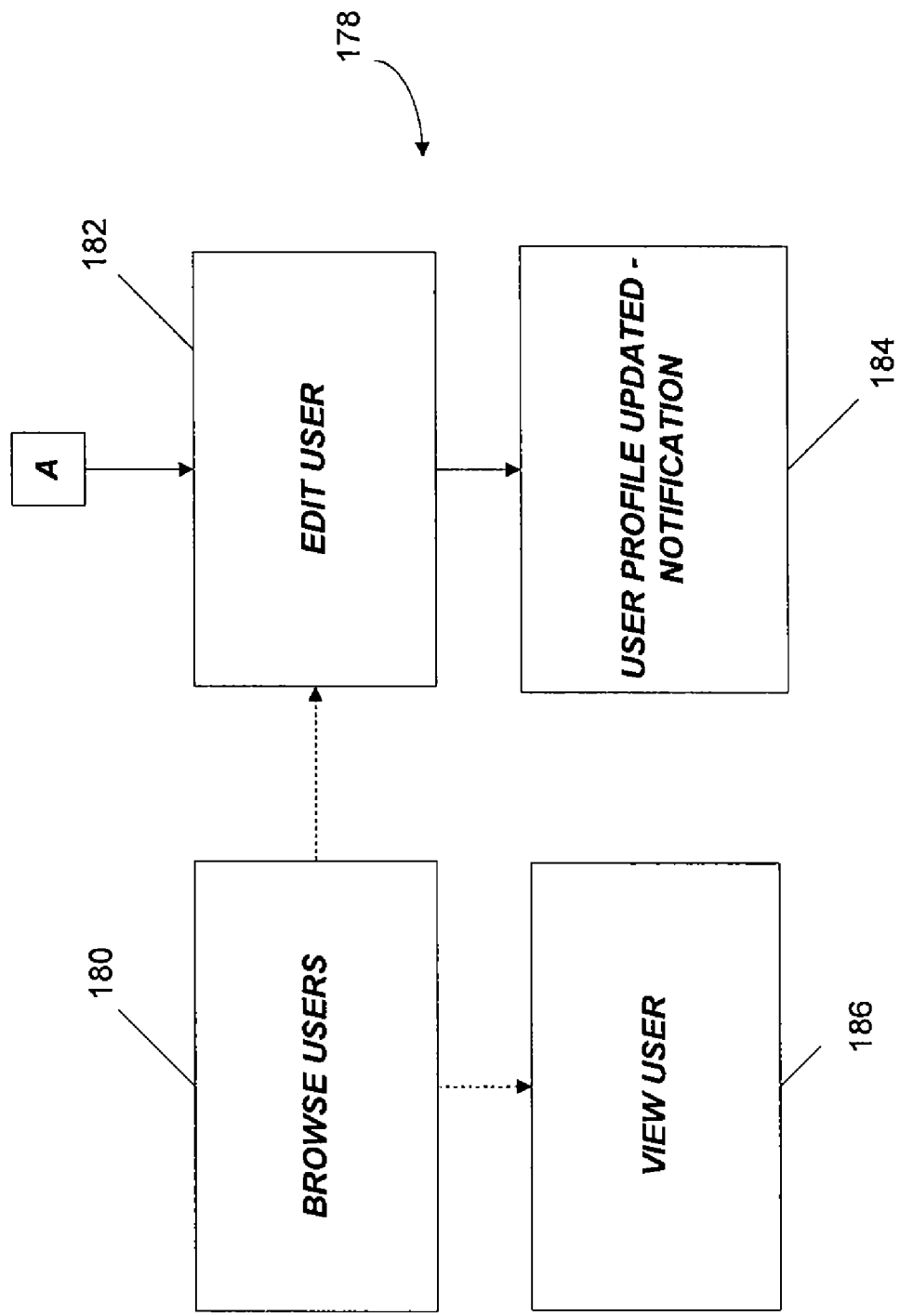
FIG. 25 is a schematic illustration of a maintain user process.

FIG. 25 illustrates a maintain user process 178, which can be included in the manage organization process 104 and can continue from FIG. 22 at A. The maintain user process 178 can be used to browse the users in each organization and to view, edit, and update the users in each organization. The maintain user process 178 can be performed by any of the participants using the organization module 42. The maintain user process 178 of FIG. 25 includes a browse users task 180, an edit user task 182, a user profile updated notification task 184, and a view user task 186.

Figure 26:
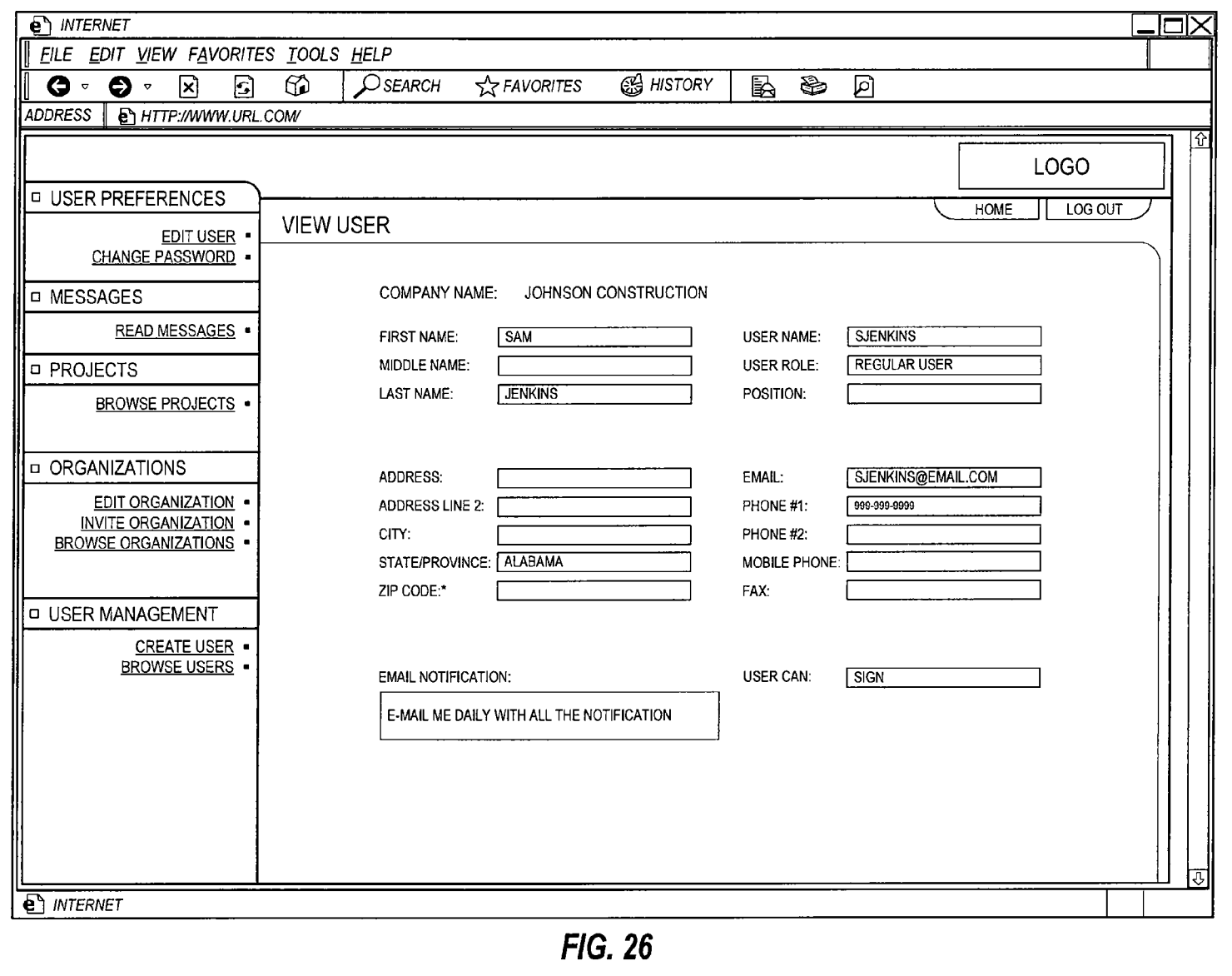

FIG. 26 illustrates a view user screen that can be associated with the view user task 186. The view user screen of FIG. 26 includes the user's personal information, email notification preference, and security clearance level.

Figure 27:
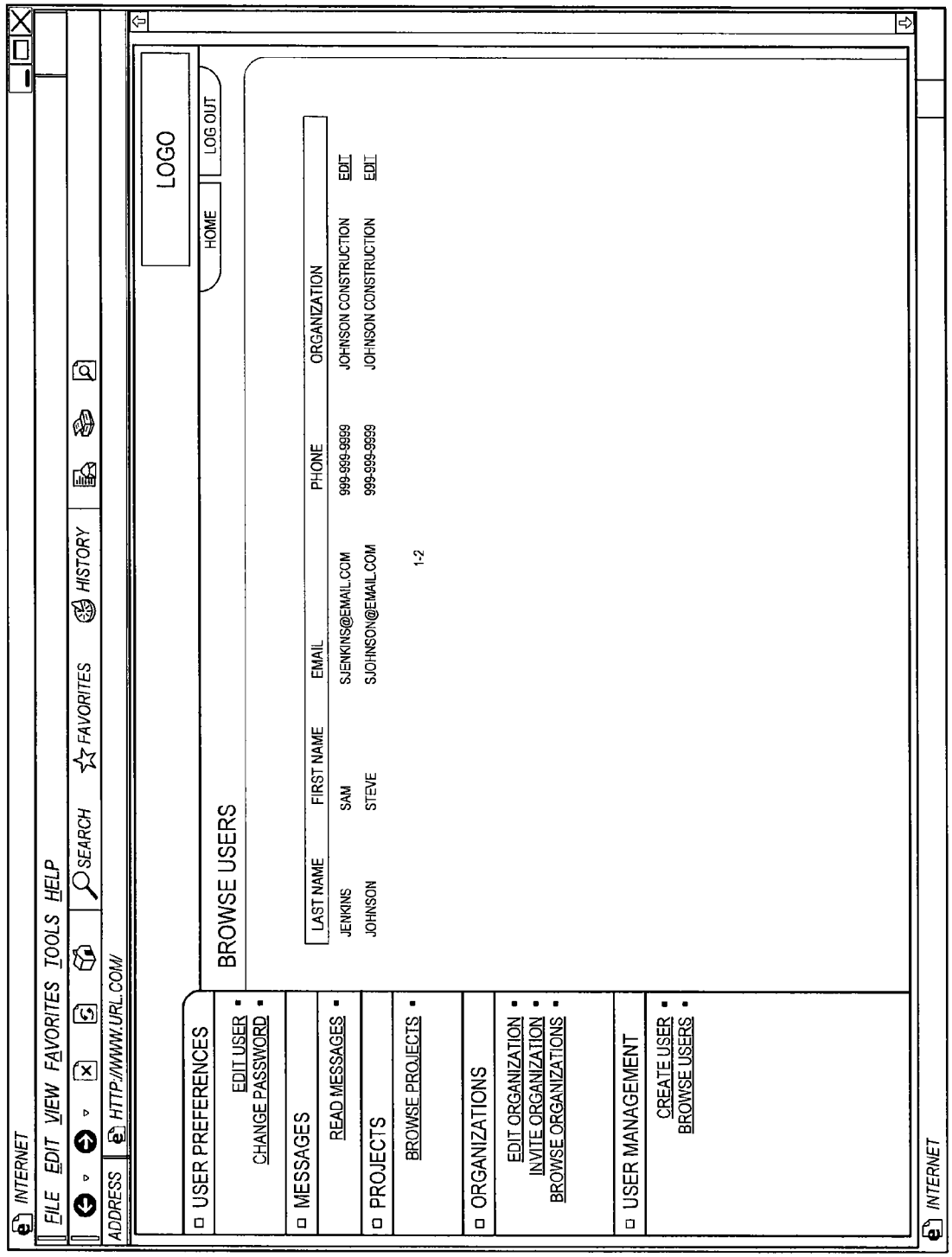
FIG. 27 is an illustration of a browse users screen.

FIG. 27 illustrates a browse users screen that can be associated with the browse users task 180. The browse users screen of FIG. 27 includes a list of one or more users for each participant, and can include the users' names, email addresses, and phone numbers. The browse users screen can also include links to edit the information for each user.

FIG. 28 illustrates an edit user form that can be associated with the edit user task 182. A user can provide personal information, email notification preferences, and security clearance levels.

Figure 29:
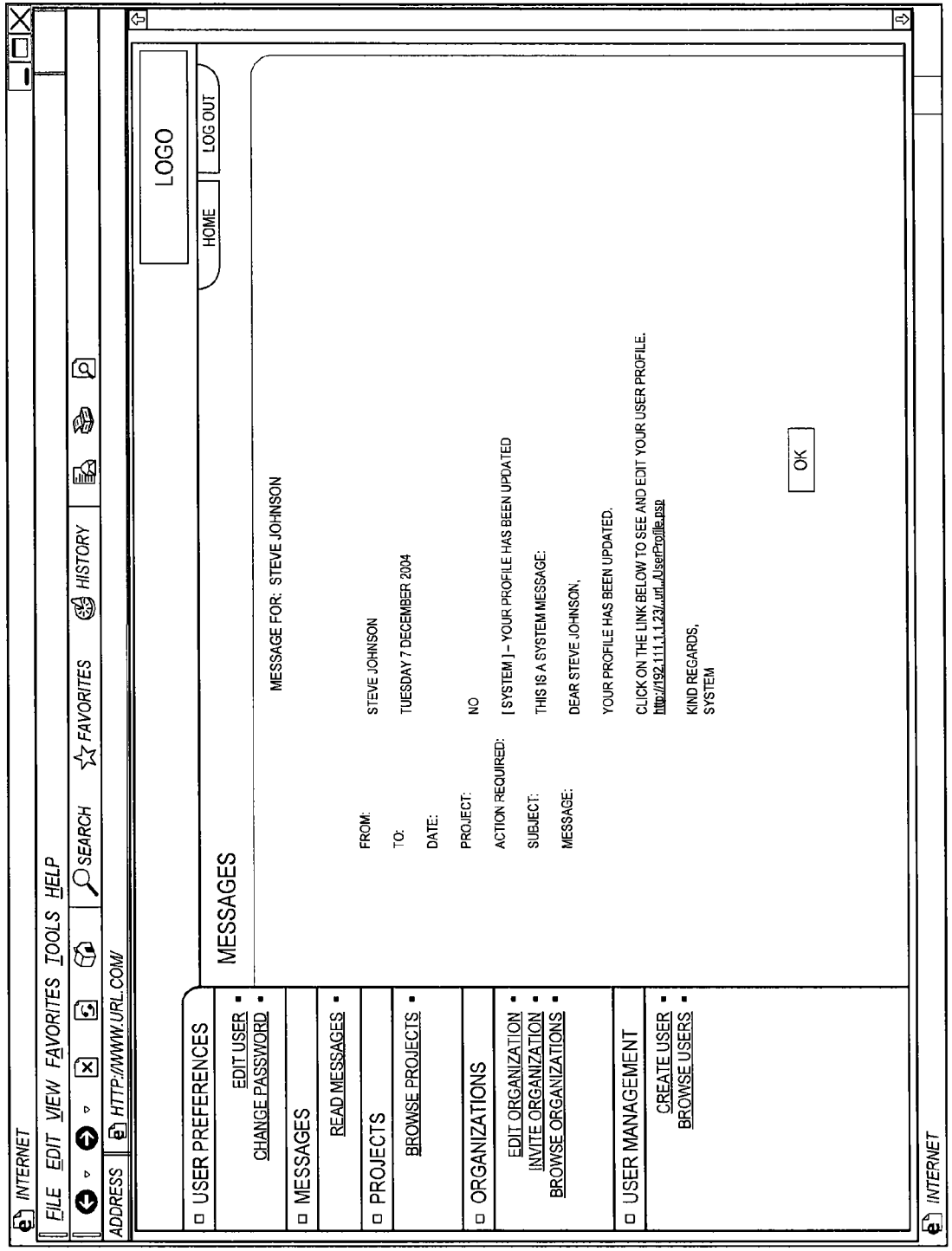
FIG. 29 is an illustration of a user profile updated notification.

FIG. 29 illustrates a user profile updated notification that can be transmitted during the user profile updated notification task 184.

Returning to FIG. 6, a first step of the manage project process 97 can include an interface project/contracts process 98. As described above with respect to FIGS. 2 and 3, the interface project/contracts process 98 can include uploading project data and/or contract data from an external system of the homebuilder to the CPMS 10 via the interface module 92. For example, the project data and contract data can be uploaded to the CPMS 10 from an ERP system of the homebuilder 74.

Figure 30:
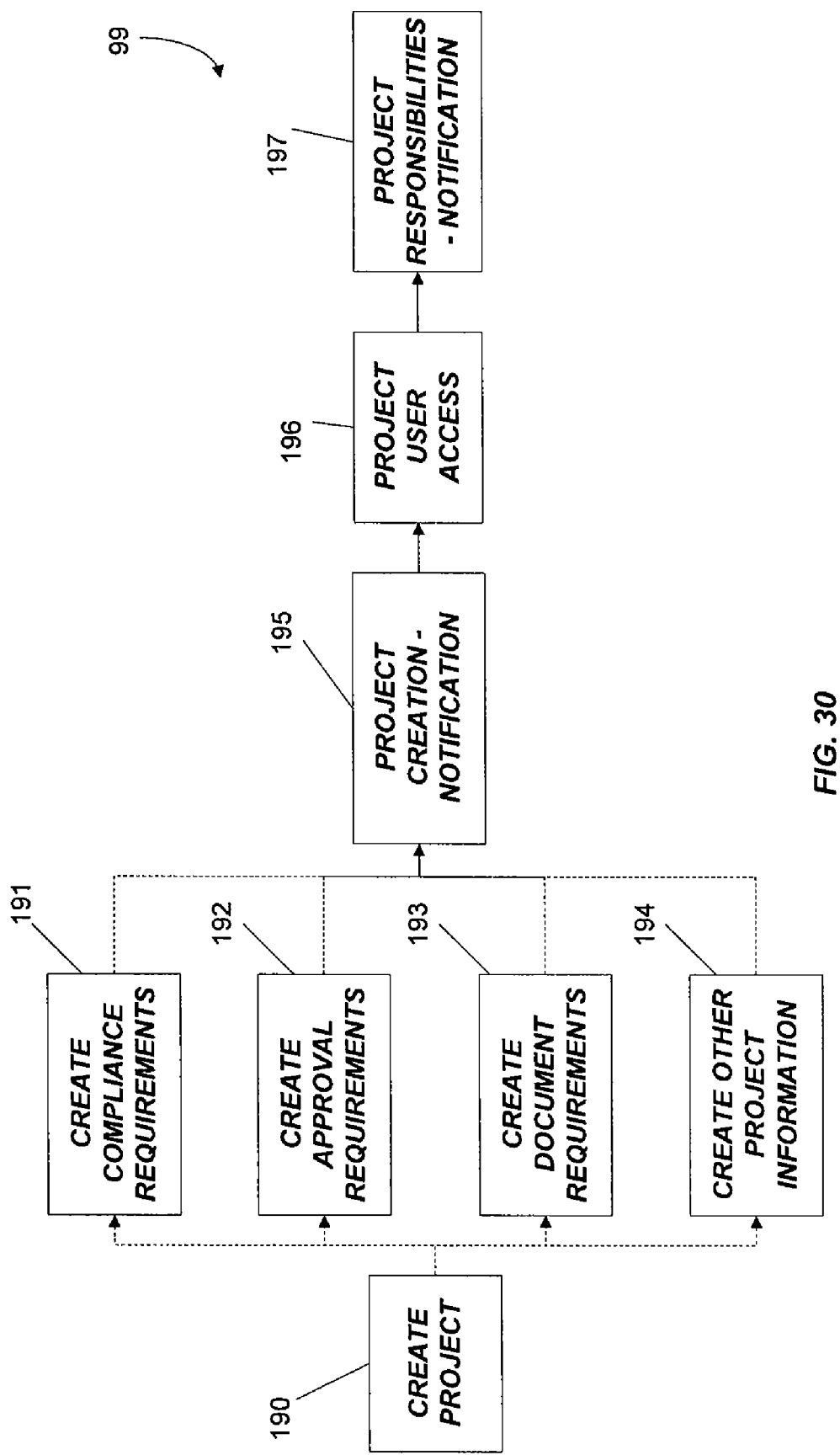
FIG. 30 is a schematic illustration of a create project process.

FIG. 30 illustrates a create project process 99, which can be included in the manage project process 97. The create project process 99 can be performed by the homebuilder 74 using the project module 28 to initiate a new project in the CPMS 10. The create project process 99 of FIG. 30 includes a create project task 190, a project creation notification task 195, a project user access task 196, and a project responsibilities task 197. In embodiments that include document compliance functionality such as described above, the create project task 190 may further include creating project compliance requirements (task 191), creating project approval requirements (task 192), creating project document requirements (task 193), and/or creating other project requirements (task 194).

In some embodiments, the CPMS 10 can initiate a new project based on project data and/or contract data uploaded to the CPMS 10 from an external system of the homebuilder 74. In other embodiments, in place of uploading data or in addition to uploading data to the CPMS 10, the homebuilder can manually enter data and/or verify data. FIGS. 31 and 32 illustrate a create project form that can be associated with the create project task 190. A homebuilder 74 can use the create project form of FIGS. 31 and 32 to provide project identification information, project funding information, project owner information, project architect information, and site information. A homebuilder 74 can also use the create project form of FIGS. 31 and 32 to verify project and/or contract information uploaded from an external system. For example, a homebuilder 74 can use the create project form of FIGS. 31 and 32 to enter and/or verify a document template for a lien waiver, a site description, a site address, a site state, a site county, a contract amount, and/or a contract date.

Figure 33:
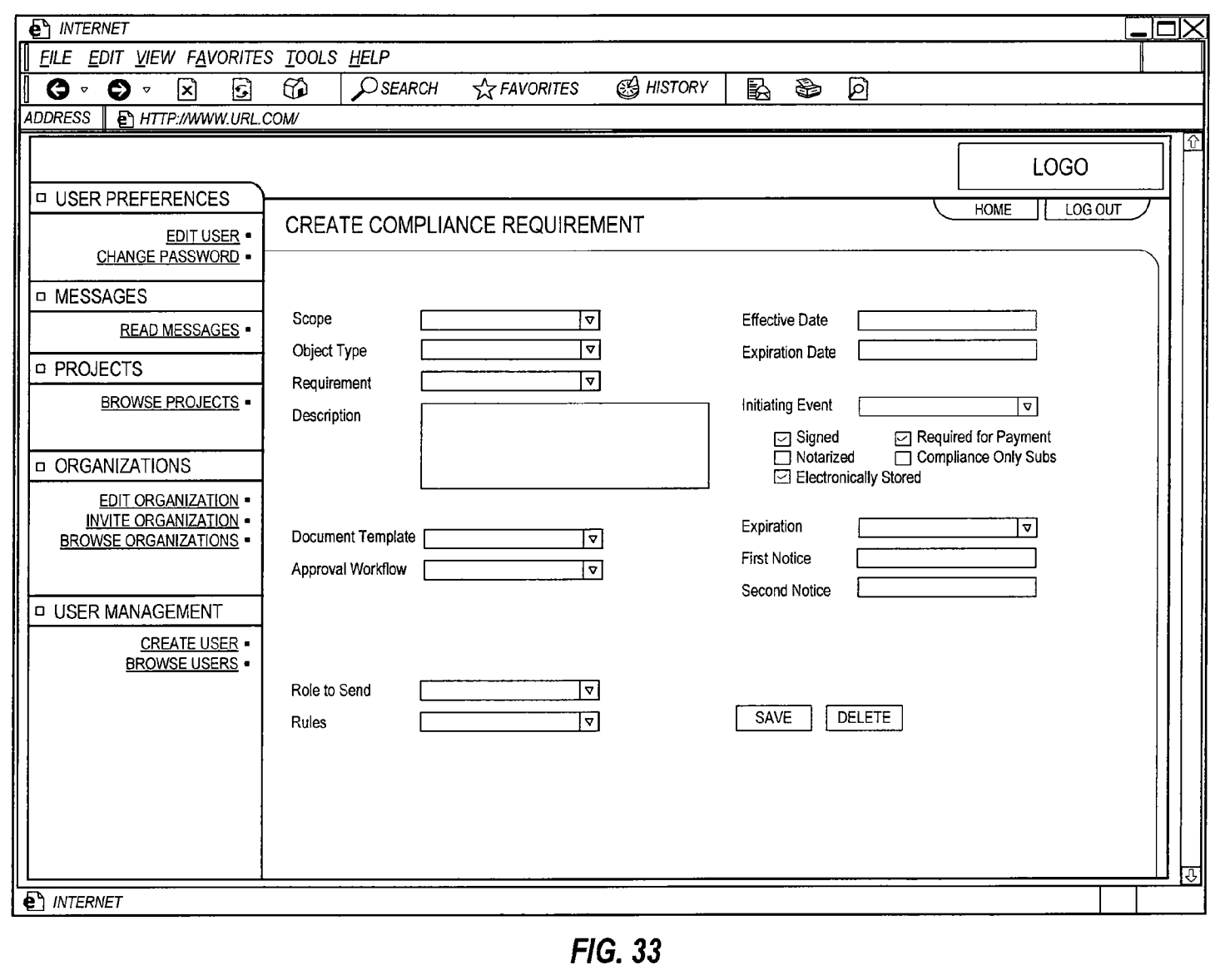

FIG. 33 illustrates a create compliance requirement form. A homebuilder 74 can use the create compliance requirement form to identify situations in which additional documents, information, or approvals are required before payment is effectuated. The homebuilder 74 can indicate the scope of the requirement (e.g. whether the requirement applies to a specific project, a specific vendor or subcontractor, or to all projects and payees associated with the homebuilder 74). The homebuilder 74 can identify the object type (e.g., an invoice, a check, a sworn statement, or a lien waiver) and can indicate the requirement associated with that object. The homebuilder 74 can also use this form to indicate a time period when the requirement will be in effect such as an effective date, an expiration date, or an initiating event. The homebuilder 74 can also set deadlines for satisfying the requirement.

As described above in reference to FIG. 3, the CPMS 10 can be configured to hold payment until an additional document is received. Using the create compliance requirement form of FIG. 33, a homebuilder 74 can identify the additional document and check the "Required for Payment" box. The create compliance requirement form can also be used to set a time for sending a first and second notice of the non-compliant item to the applicable party.

Also as described above in reference to FIG. 3, a homebuilder 74 can require that certain requested documents be approved before payment is effectuated. Using the create compliance requirement form of FIG. 33, the homebuilder 74 can identify the document ("Object Type") and set an approval requirement. The create compliance requirement form of FIG. 33 also allows the homebuilder 74 to set an approval workflow or identify multiple participants that must approve the document before payment is effectuated.

Figure 34:
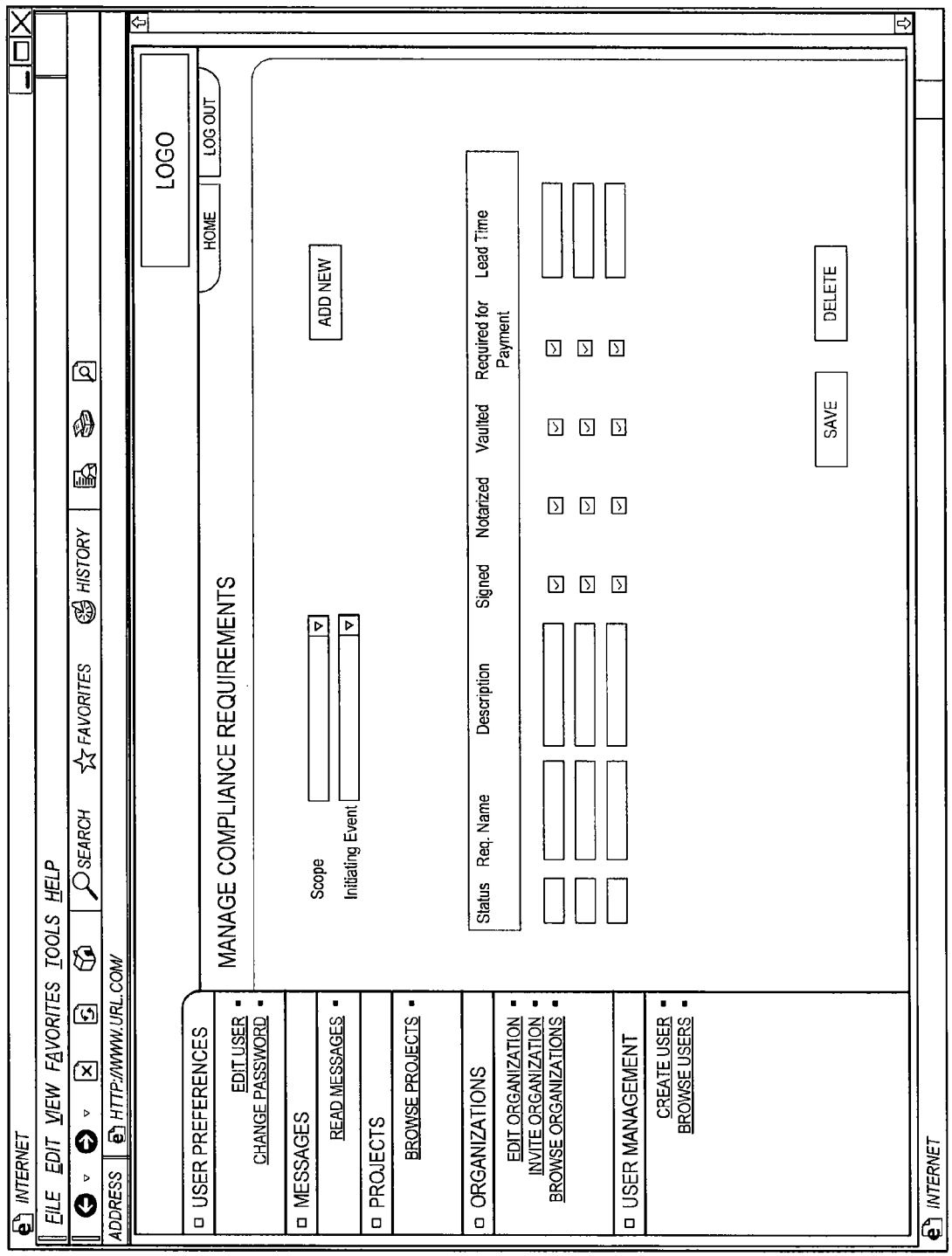
FIG. 34 is an illustration of a manage compliance requirements form.

Once created, compliance requirements can be monitored and managed through a manage compliance requirements form such as illustrated in FIG. 34. The homebuilder 74 selects the scope and/or initiating event and a list of all applicable compliance requirements is displayed. The homebuilder 74 can add, remove, or edit the requirements from this list.

Figure 35:
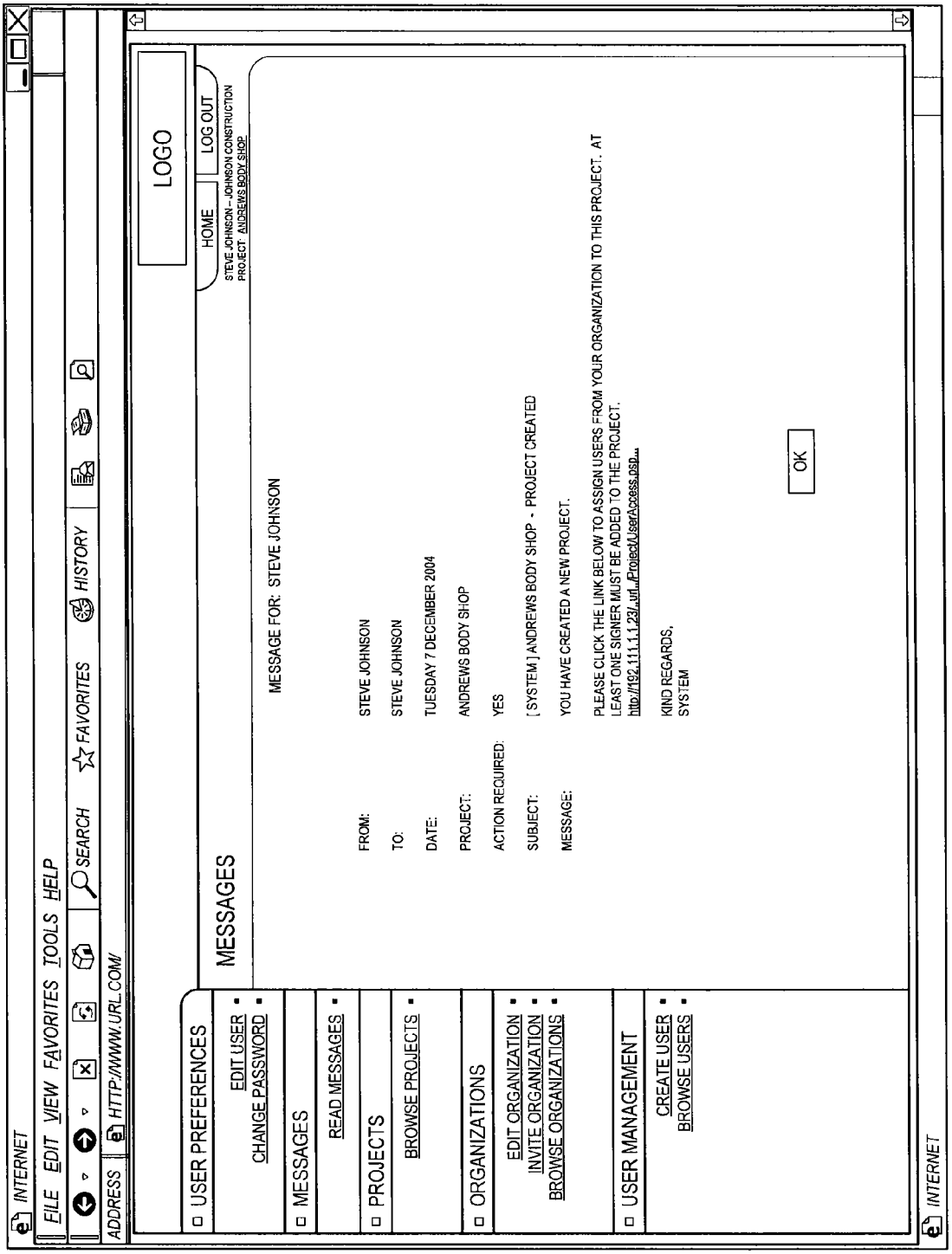
FIG. 35 is an illustration of a project created notification.

FIG. 35 illustrates a project created notification that can be transmitted during the project creation task 195 of FIG. 30. The notification of FIG. 35 includes a statement that the homebuilder 74 has created a new project, along with a link to a screen that allows users to be assigned to the project.

Figure 36:
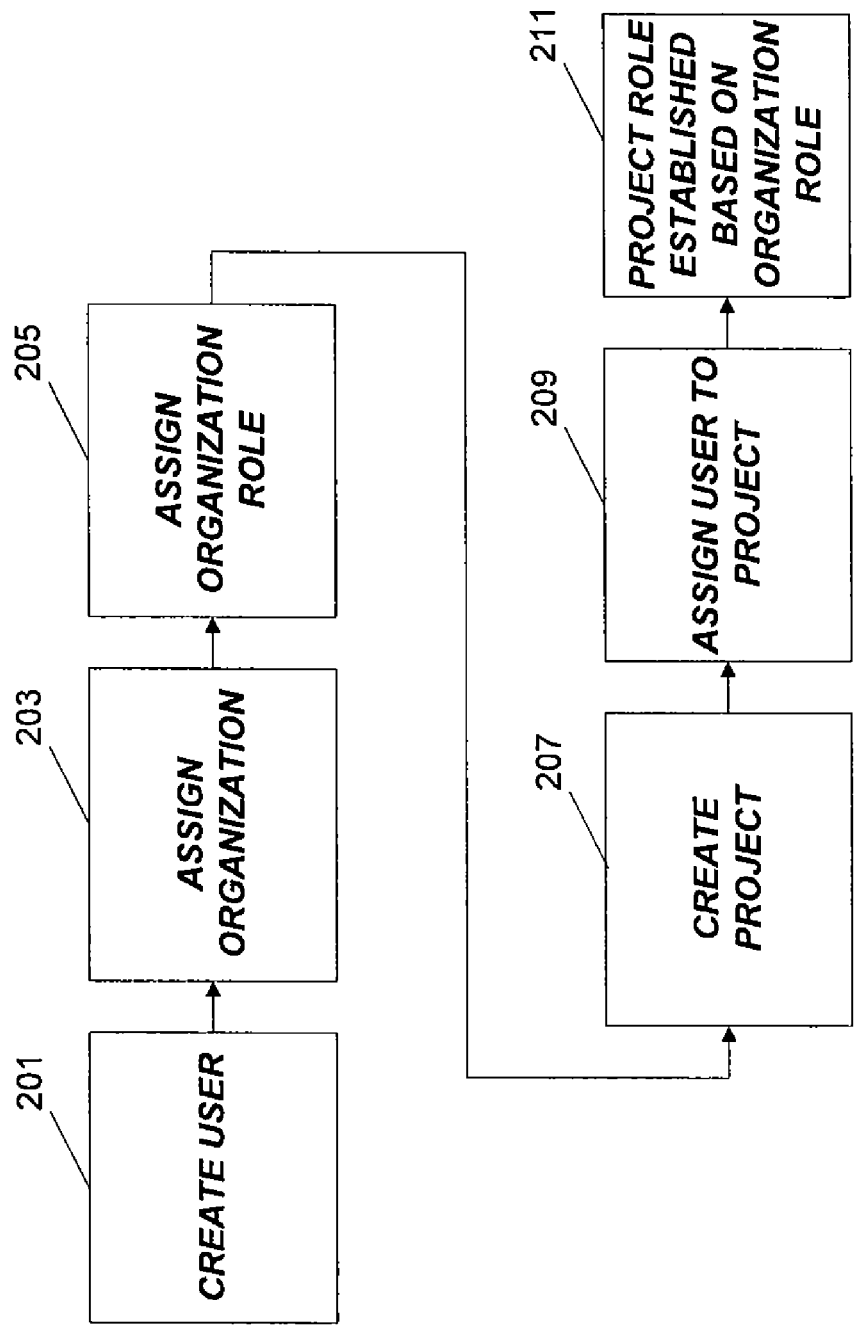
FIG. 36 is a schematic illustration of a process for assigning user roles for a project.

FIG. 36 illustrates a process for assigning user roles for a project and, in some embodiments, may overlap with the create project task 190 and the project user access task 196 from FIG. 30. When a new user is created (step 201), the user is associated with an organization (step 203) and given a role within that organization (step 205). When a new project is created (step 207) and the user is assigned to that project (step 209), the system in this example automatically associates the user's role within the organization with the role that the user will have in the project.

Figure 37:
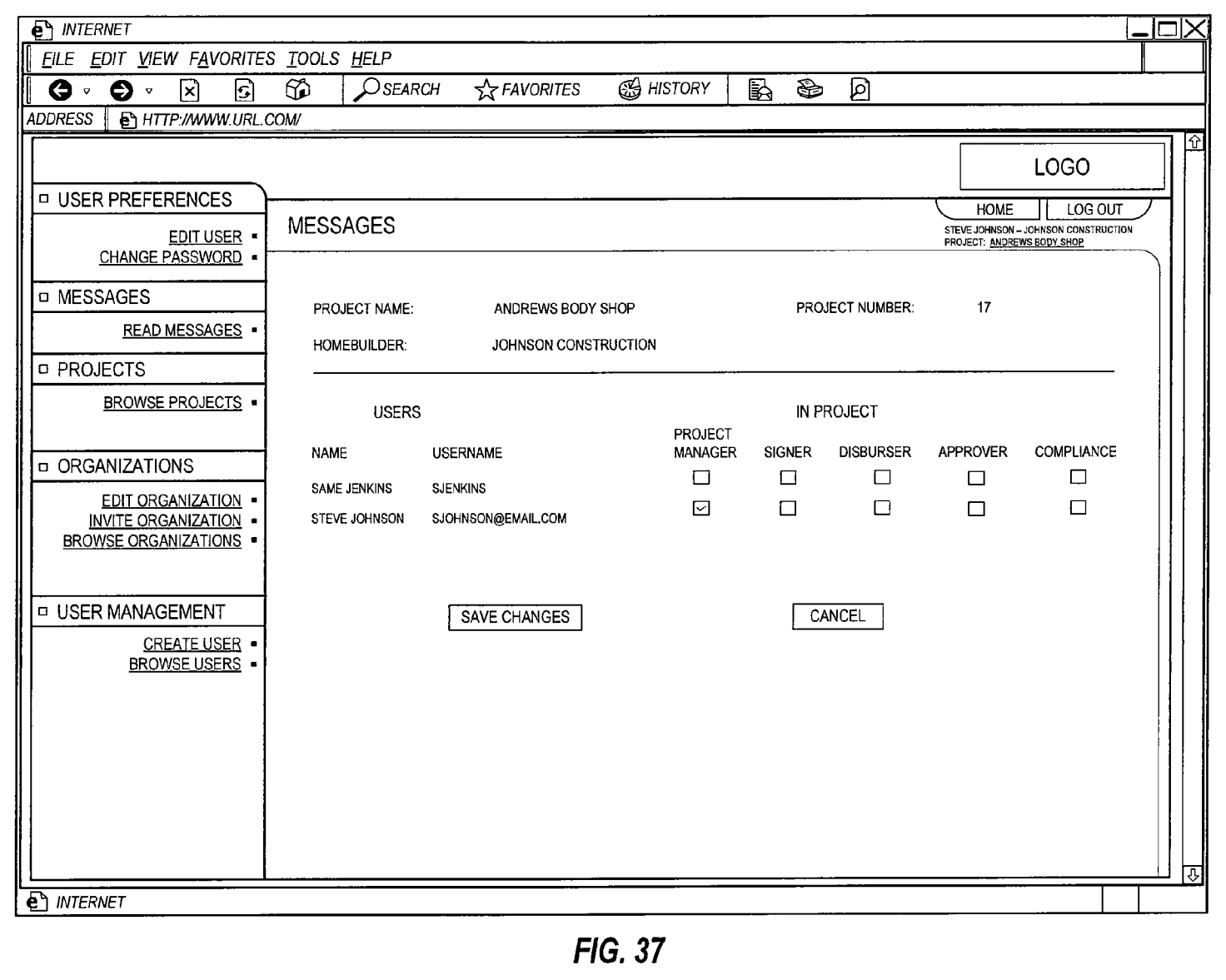

FIG. 37 illustrates a project user access screen that can be associated with the project user access task 196. The project user access screen includes the project name, the project number, the homebuilder name, and a list of users for a particular project and/or a particular organization. The users can be identified by name and username, and, in some embodiments, can be deemed a project manager or a signer. This screen displays a list of users currently associated with a project and the respective roles currently assigned to the users. This list of users and their assigned roles can be modified from this screen. For example, if a compliance requirement is created with the create compliance requirement form of FIG. 33, "Sam Jenkins" can be assigned a "compliance" role. If a requirement is created that requires approval before a payment is effectuated, "Steve Johnson" can be given the role of "approver" for this project.

Figure 38:
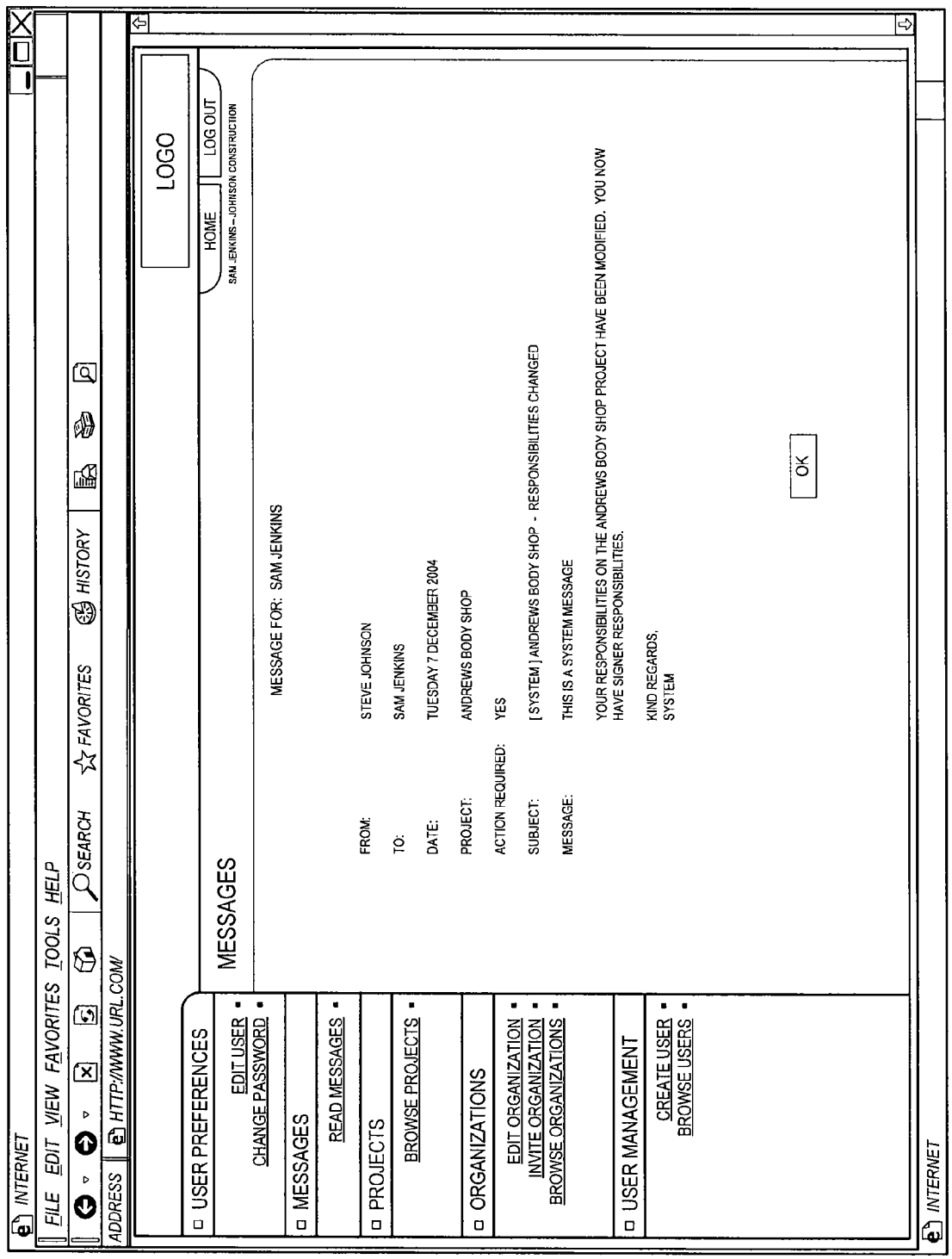
FIG. 38 is an illustration of a project responsibilities notification.

When a project role or responsibility is created or changed, a notification is sent to the appropriate user. FIG. 38 illustrates a project responsibilities notification that can be transmitted during the project responsibilities notification task 197 of FIG. 30. The notification of FIG. 38 can include a statement that a user's responsibilities with respect to a project have been modified.

Figure 39:
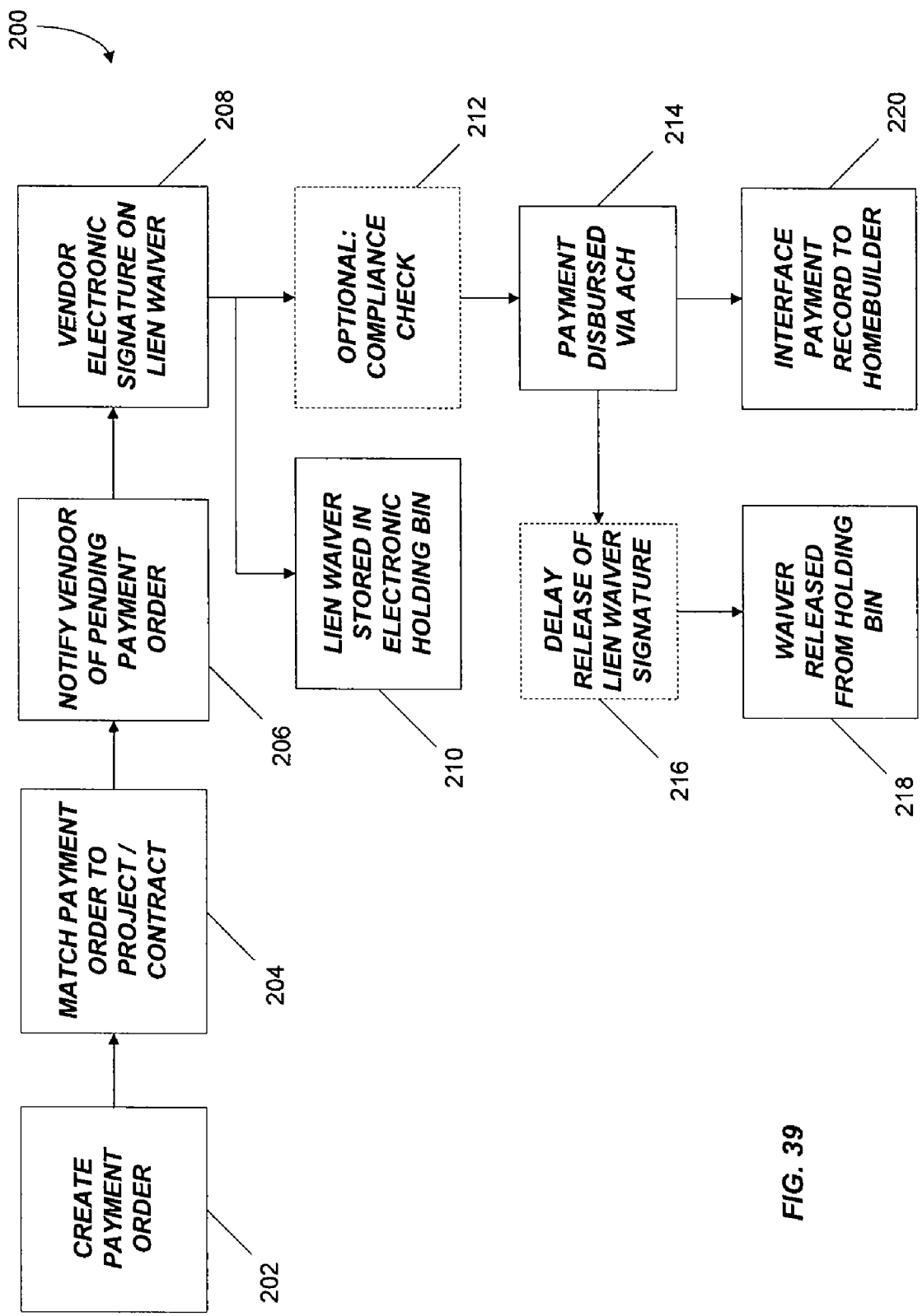
FIG. 39 is a schematic illustration of a lien waiver exchange process.

As described above with respect to FIGS. 2 and 3, a homebuilder can use the CPMS 10 to exchange payments for electronically signed lien waivers. FIG. 39 illustrates a lien waiver payment exchange process 200 that can be performed by the CPMS 10. As stated above in reference to the examples illustrated in FIGS. 2-5, although in this example builder 74 is a homebuilder, the functionality of CPMS 10 described in FIG. 39 can also be applied to builders engaged in non-residential construction. Furthermore, although this example describes an exchange between a homebuilder 74 and a vendor, the second participant can also be of another type such as a subcontractor or a materials supplier.

As shown in FIG. 39, to initiate a lien waiver payment exchange, the CPMS 10 can create a payment order (step 202) based on information specified by the homebuilder 74. As described above with respect to FIGS. 2 and 3, the homebuilder 74 can manually enter the payment information into the CPMS 10, or the payment information can be uploaded from an external system of the homebuilder 74 (e.g., an ERP system) via the interfaces module 92. Each payment order managed by the CPMS 10 includes information that links the line item with the correct project and the correct contract to be paid. The payment information associated with a payment order can include a project name/development, project owner information, a project identifier, a transaction identifier, a contract identifier, and a payment amount.

The payment orders are then stored in the CPMS 10 in the context of the project and the contract to which they relate. The CPMS 10 maintains an organization/user hierarchy independent of payment transactions. The hierarchy provides the structure for storing payments as well as the user/permission structure that determines who the authorized person from any given organization is for signing and/or notarizing purposes and that controls access to information managed by the CPMS 10. The project/contract data structures can also specify the information required to complete the correct lien waiver form for a particular vendor 93.

As shown in FIG. 39, once the payment order information is received by the CPMS 10, the CPMS 10 matches the payment order to a project and/or contract using the project and contract information previously obtained from the homebuilder 74 (e.g., manually from the homebuilder 74 or uploaded from an external system of the homebuilder 74) (step 204). The vendor 93 is then notified (e.g., via the notifications manager 40) to sign either a partial or a final lien waiver via an electronic signature engine of the CPMS 10 (step 206). The CPMS 10 generates the needed lien waiver and the vendor 93 electronically signs the lien waiver (step 208). In some embodiments, the CPMS 10 can generate the needed documents based on a lien waiver template specified by the homebuilder 74 (e.g., manually and/or uploaded from an external system). Once the vendor 93 signs the lien waiver, the CPMS 10 stores the signed lien waiver in the electronic holding bin/escrow 68 (step 210).

As described above with respect to FIG. 3, in some embodiments, the CPMS 10 can optionally include a document management module 88 and a compliance management module 90 that allows the CPMS 10 to provide compliance management. For example, when the CPMS 10 includes a document management module 88 and a compliance management module 90 (or includes an activated or "turned-on" document management module 88 and compliance management module 90), the CPMS 10 can obtain document requirements from the homebuilder 74. The document requirements can include a list of documents the homebuilder 74 requires from the vendors 93, deadlines for receiving the requested documents, actions to be taken if the requested documents are not received from a particular vendor 93, etc. In some embodiments, the document or compliance requirements also specify templates or specifications for the requested documents. The CPMS 10 can use the templates or specifications to generate the requested documents. As described above, the document or compliance requirements can be set at an organization level and/or a project level. In some embodiments, the homebuilder 74 can directly enter the document requirements into the CPMS 10. In other embodiments, the homebuilder 74 can load document requirements to the CPMS 10 via an external system (e.g., an ERP system) using the interfaces module 92 of the CPMS 10. After the homebuilder 74 provides document requirements to the CPMS 10, the vendor 93 can upload requested documents to the CPMS 10 for approval by the homebuilder 74.

After the homebuilder 74 provides document requirements and payment orders or data to the CPMS 10, the CPMS 10 can prompt the vendors 93 to enter (sign, notarize, submit, etc.) any missing compliance documents that are required before a vendor can receive a payment in addition to prompting the vendor 93 to sign a lien waiver. In some embodiments, the CPMS 10 can generate the compliance documents (e.g., based on the templates and/or specifications specified by the homebuilder 74) and can present the generated documents to the vendor 93 for approval and/or signature.

Therefore, as shown in FIG. 39, if the CPMS 10 provides compliance management, the CPMS 10 can perform a compliance check prior to initiating payment to a vendor 93 (step 212). As described above with respect to FIG. 3, if a vendor 93 is noncompliant with the required documents and the homebuilder 74 has selected to hold payments when a vendor 93 is deemed noncompliant, the CPMS 10 can hold a payment to the vendor (e.g., even if the vendor 93 signs the requested lien waiver).

Once the lien waiver is signed and stored (steps 208 and 210) and the vendor's compliance with the document requirements or other requirements is verified (step 212), the signed lien waiver is queued for payment (step 214). In some embodiments, the CPMS 10 automatically disburses funds to the vendor 93 via ACH or another payment network. After the payment is queued and/or initiated, the CPMS 10 allows the homebuilder 74 to view the signed lien waiver. However, in some embodiments as described above, the CPMS prevents the homebuilder 74 from viewing the signature on the lien waiver until receipt of the payment to the vendor is confirmed by the ACH or other payment network (step 216).

After receipt of the payment has been confirmed, the CPMS 10 releases the signed lien waiver from the electronic holding bin 68 (step 218). In some embodiments, the CPMS 10 also sends a receipt of payment (via email or the CPMS 10, such as the notifications manager 40) to the vendor 93. In addition, the CPMS 10 sends the homebuilder 74 a payment record (step 220). In some embodiments, the CPMS 10 transmits the payment record to an external system of the homebuilder 74 (e.g., an ERP system) through the interfaces module 92.

Although the example of FIG. 39 is related to a homebuilder receiving a signed lien waiver from a vendor, the participants and documents can vary. For example, the payor may be a property owner or a non-residential builder and the payee can be a subcontractor or materials supplier. Similarly, the payment distribution of step 214 may be initiated through an automated clearing house (ACH) as shown in FIG. 39 or through some other form of payment. Furthermore, the steps may be added, removed, or arranged in a different order than as shown in FIG. 39. For example, the compliance check at step 212 may be removed in some systems or optional in some projects. Similarly, some systems may release the signed document (step 218) immediately after payment is initiated (step 214); thereby eliminating the delay of step 216.

As described above with respect to FIG. 2, the CPMS 10 can be configured to support a "specified billing" environment in place of or in addition to being configured to support a "specified payment" environment, as shown in FIG. 39. For example, instead of the homebuilder 74 specifying a payment for a vendor 93, as shown in FIG. 39, the homebuilder 74 can use the CPMS 10 to generate an invoice for a vendor 93 that includes a requested payment amount. The vendor 93 can view and approve or decline the invoice via the CPMS 10, but cannot modify the invoice. Once the vendor 93 approves the invoice, the CPMS 10 can prompt the vendor 93 to sign a lien waiver in order to initiate the approved payment. Once the vendor 93 signs the lien waiver (and, optionally, is compliant with the document requirements specified by the homebuilder 74), the CPMS 10 initiates the payment to the vendor 93, as shown in FIG. 39.

In addition, the CPMS 10 can be configured to support an invoicing environment, wherein a vendor 93 uses the CPMS 10 to create an invoice and submit the invoice to the homebuilder 74 for approval. Once the homebuilder 74 approves the invoice, the CPMS 10 prompts the vendor 93 to sign a lien waiver in order to initiate the approved payment. Once the vendor 93 signs the lien waiver (and, optionally, is compliant with the document requirements specified by the homebuilder 74), the CPMS 10 initiates the payment to the vendor 93, as shown in FIG. 39.

It should be understood that in some embodiments a residential construction project may include multiple properties (e.g., lots in a single subdivision). When a construction project includes multiple properties, the CPMS 10 can initiate a single payment to a particular vendor 93 wherein a single payment covers multiple properties or can initiate separate payments for each property. Similarly, the CPMS 10 can generate one lien waiver for a particular vendor that is associated with multiple properties (e.g., lien waiver by subdivision) or can generate separate lien waivers for each property (e.g., lien waiver by lot).

It should also be understood that the CPMS 10 can create a project that includes multiple properties. Therefore, when a vendor 93 registers with the CPMS 10 and/or the project, the vendor 93 is automatically registered and available to be associated with each property included in the project. In some embodiments, once a vendor 93 is registered with the CPMS 10, the homebuilder 74 can use the CPMS 10 to assign particular vendors 93 to particular projects.

In some embodiments, the CPMS 10 can also manage budgets or schedules of values associated with a particular project, property, vendor 93, etc. For example, a homebuilder 74 (and/or a vendor 93) can input a budget using the CPMS 10. The homebuilder 74 can manually enter budget information into the CPMS 10 or the CPMS 10 can obtain budget information from an external system of the homebuilder 74 via the interfaces module 92. Once the CPMS 10 receives budget information, it can use the budget information to generate documents (e.g., invoices, lien waivers, etc.), verify payment amounts, etc. For example, as described above with respect to FIG. 2, in some embodiments, a vendor 93 can use the CPMS 10 to generate and submit an invoice. To generate an invoice, the vendor 93 can specify a payment amount or a percent complete. If the vendor 93 specifies a percent complete, the CPMS 10 can automatically generate an invoice by calculating a payment based on a budget amount and the specified percent complete. The CPMS 10 can also verify a payment amount specified by a homebuilder 74 against a budget amount. Change orders to the budget can also be provided to (e.g., manually and/or uploaded from an external system via the interfaces module 92) and managed through (e.g., approved) the CPMS 10. In some embodiments, the CPMS 10 can also allow an inspector to input inspection information, such as percent complete information, which the CPMS 10 can use to generate and/or verify invoices, lien waivers, payment amounts, etc.

Figure 40:
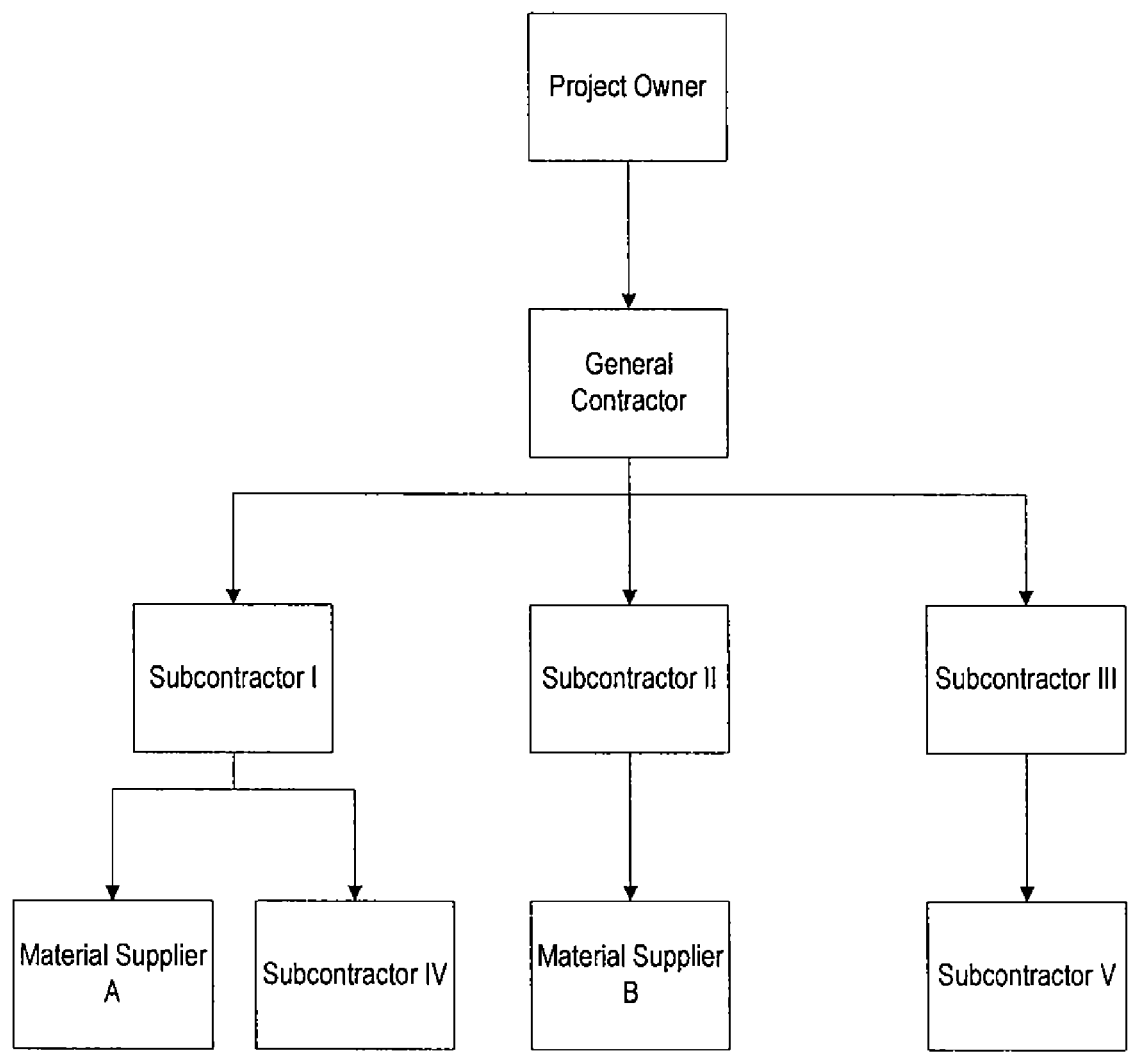
FIG. 40 is an illustration of the tiered relationships between multiple participants in a construction project.

The various participants may have varying levels of involvement in a given construction project. For instance, although a project owner and/or a general contractor may oversee all aspects of the project, other participants may be less involved. FIG. 40 illustrates an example of one-such multiple-tiered construction project. The project owner hires and oversees a general contractor. The general contractor, in turn, hires multiple subcontractors (e.g., Subcontractor I, Subcontractor II, and Subcontractor III) to complete certain portions of the project. Each subcontractor may hire and oversee further subcontractors to perform specific work or material suppliers to provide materials for the project. Although these sub-tier contractors report directly to other sub-contractors, the payment for their goods or services ultimately comes from the project owner or general contractor. Such payment is usually in the form of a payment from the directly supervising prime sub-contractor who is then paid by the general contractor.

Although a prime subcontractor (such as Subcontractor I in FIG. 40) will benefit from the comprehensive functionality of the CPMS 10 described above (e.g., budget tracking, scheduling, payment monitoring, etc.), a sub-tier contractor (such as Subcontractor IV in FIG. 40) may not need access to the comprehensive functionality due to a significantly lower level of involvement in the project. However, not allowing or requiring the sub-tier contractor to use the CPMS 10 may cause other problems. For example, without using the CPMS 10, the sub-tier contractor (e.g., Subcontractor IV) might be paid directly by the prime subcontractor (e.g., Subcontractor I). The prime subcontractor then includes the cost of the goods or services provided by the sub-tier contractor when the prime subcontractor submits an invoice or requests payment from the general contractor (e.g., the payor). However, in some jurisdictions, all contractors performing work or providing materials may have a claim to the resulting construction project until they are paid for those goods or services. Without the proper documentation (e.g., a signed lien waiver), a hidden sub-contractor (i.e., a sub-tier contractor who is not known to the payor) may be able to make a financial claim to the construction property.

Among other things, the CPMS 10 simplifies the lien waiver process for sub-tier contractors while also ensuring that all lien waivers are collected by the project payor. In some embodiments, the sub-tier contractor registers with the CPMS 10 and provides information including contact and banking information. At the time of registration, the sub-tier contractor indicates that he is registering as a sub-tier contractor and, therefore, will not be granted access to the full, comprehensive features of the CPMS 10. Alternatively, in some embodiments, a prime subcontractor adds a particular sub-tier contractor to the CPMS 10 during the course of a project. In such cases, the sub-tier contractor is only able to access the CPMS 10 until the particular project is completed.

Figure 41:
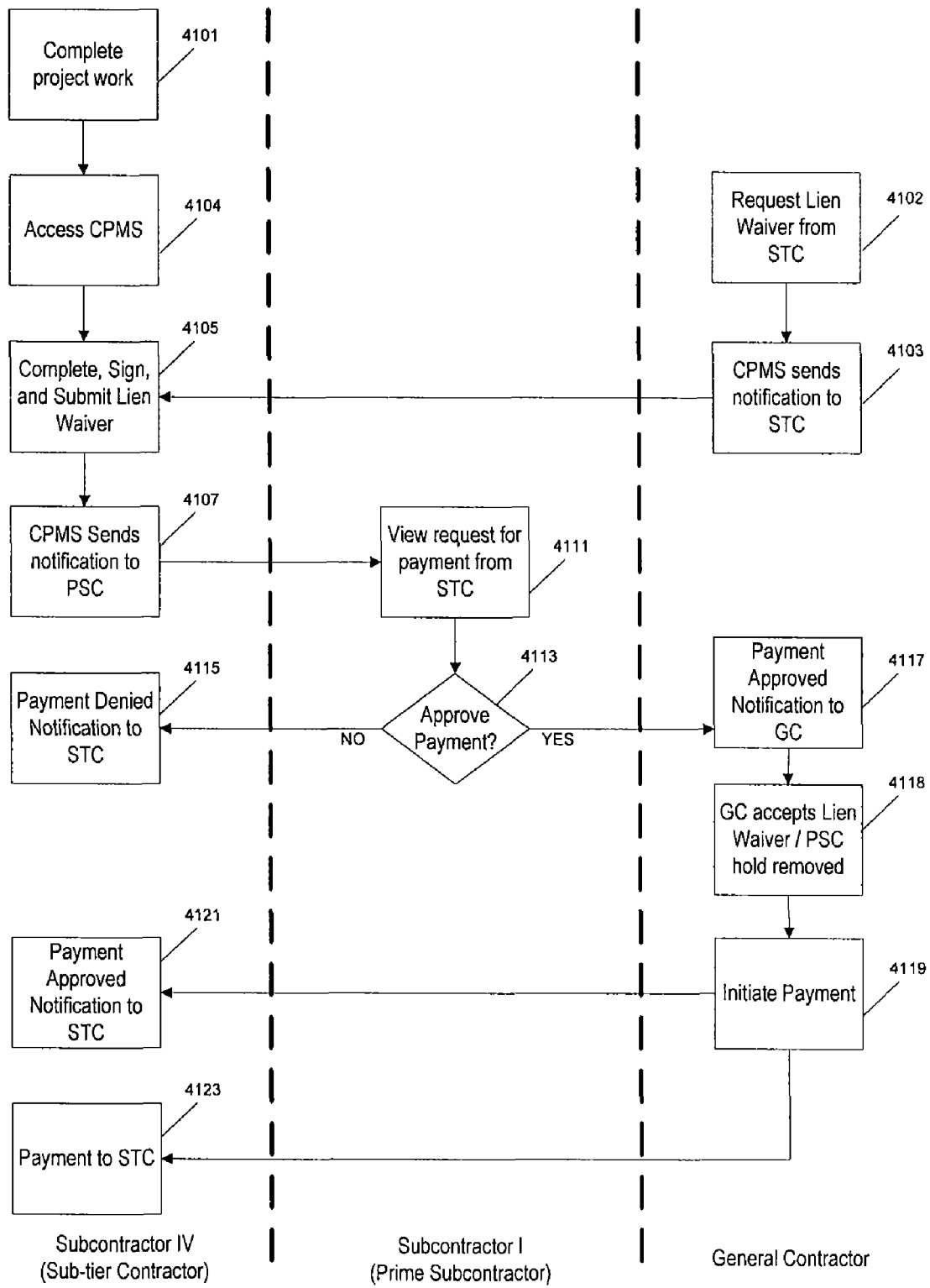
FIG. 41 is a flowchart of a lien waiver exchange process between three participants in a multiple tiered construction project of FIG. 40 using the construction payment management system.

FIG. 41 illustrates how the CPMS 10 interacts with participants in a multiple-tiered construction project. This example uses three participants from the multiple-tiered project of FIG. 40: General Contractor (the payor), Subcontractor I (the prime subcontractor), and Subcontractor IV (the sub-tier contractor). General Contractor has hired Subcontractor I to oversee and complete a portion of the construction project. Subcontractor I has, in turn, hired Subcontractor IV, thereby creating a parent-child-grandchild relationship (i.e., payor-prime subcontractor-sub-tier contractor). After Subcontractor IV completes the project work (step 4101), General Contractor accesses the CPMS 10 and requests that Subcontractor IV submit a signed lien waiver and a request for payment (step 4102). The CPMS 10 generates a notification informing Subcontractor IV of this request (step 4103). The next time Subcontractor IV accesses the CPMS 10 (step 4104), the CPMS 10 displays the notification and requests that Subcontractor IV complete the necessary forms or submit the required documents. Subcontractor IV then completes, signs, and submits the lien waiver (step 4105). As described in detail below, Subcontractor IV can submit this information in a variety of ways using the CPMS 10. In the embodiment described below in reference to FIG. 43, Subcontractor IV completes an on-line form and submits an electronic signature using the CPMS 10. In some embodiments, Subcontractor IV is able to complete the lien waiver by hand and upload a signed copy to the CPMS 10. Furthermore, in some embodiments, Subcontractor IV is able to submit a lien waiver and request for payment (step 4105) without receiving a request to do so from General Contractor (step 4103).

After the CPMS 10 receives the lien waiver, a notification is sent to Subcontractor I indicating that Subcontractor IV has requested payment and has submitted a signed lien waiver (step 4107). When Subcontractor I accesses the CPMS 10, the notification is displayed. Subcontractor I then reviews the payment request (step 4111) and decides whether or not to approve the payment (step 4113). If Subcontractor I disapproves of the payment (e.g., the work has not been completed or the value of the payment is disputed), the CPMS 10 sends a notification to Subcontractor IV indicating that the payment has been denied (step 4115). However, if Subcontractor I approves of the requested payment, a notification is sent to the General Contractor (step 4117) indicating that the payment has been approved by the prime subcontractor (e.g., Subcontractor I). General Contractor accepts the lien waiver (step 4118), and payment is initiated (step 4119). The CPMS 10 sends a notification to Subcontractor IV indicating that the payment was approved (step 4121) and payment is made directly from the General Contractor to Subcontractor IV (step 4123).

In some embodiments, the CPMS 10 places a hold on all payments to the prime subcontractor (e.g., Subcontractor I) when a lien waiver is requested from a sub-tier contractor (e.g., Subcontractor IV) (step 4102). The payment hold is released after the signed lien waiver is received and accepted by the payor (e.g., General Contractor) (step 4118). If lien waivers have been requested from multiple sub-tier contractors under the same prime subcontractor, the hold is not released until all lien waivers have been received.

Furthermore, in some embodiments, payments are made step-wise through each participant in the multiple tiered project hierarchy. Such step-wise payment may work similarly to and in conjunction with the payment hold described above. Instead of initiating a payment from the payor (e.g., General Contractor) directly to the sub-tier contractor (e.g., Subcontractor IV), the CPMS 10 initiates a payment from the prime subcontractor (e.g., Subcontractor I) to the sub-tier contractor upon receiving approval of the request for payment from the prime subcontractor. When all of the necessary lien waivers from the prime subcontractor and his contractual children (e.g, Subcontractor IV and Material Supplier A) are received by the CPMS 10, the CPMS 10 initiates a payment from the payor to the prime subcontractor.

Figure 42:
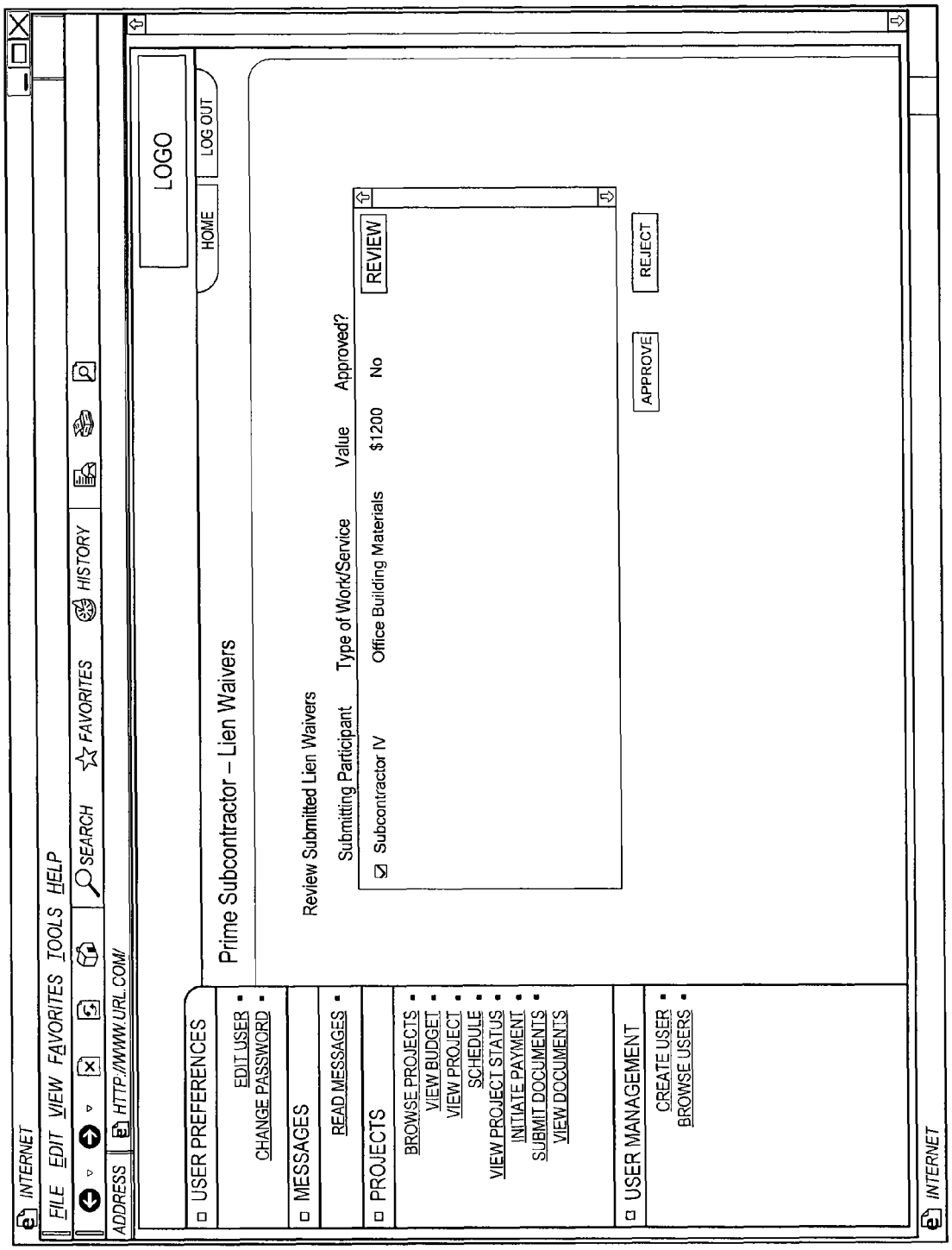
FIG. 42 is a user interface screen accessible to a prime sub-contractor with full comprehensive functionality.

Using the method of FIG. 41, the sub-tier contractor (e.g., Subcontractor IV) is able to complete and submit a signed lien waiver and initiate the payment process without requiring access to the full functionality of the CPMS 10. FIGS. 42 and 43 further illustrate an example of the limited functionality provided to the sub-tier contractor. FIG. 42 is a user interface screen displayed by the CPMS 10 to a prime subcontractor with access to the full functionality of the CPMS 10. The prime subcontractor is able to track and review submitted lien waivers and requests for payment by clicking the "REVIEW" button next to a lien waiver displayed in the list. After reviewing a received lien waiver, the prime subcontractor can approve or reject the request for payment by selecting the check-box to the left of a lien waiver displayed in the list and then clicking either the "APPROVE" or "REJECT" button. Furthermore, the prime subcontractor is able to access other features of the CPMS 10 using the links provided on the left of the interface screen under the "PROJECTS" heading. The prime subcontractor is able to view project budgets, view project schedule, view project status, initiate payments, submit and view documents, and perform a variety of other project related activities.

In contrast, FIG. 43 illustrates a user interface screen presented to a sub-tier contractor. The sub-tier contractor is only able to fill out a limited number of predetermined fields that are used to generate the lien waiver document. After completing the required fields, the sub-tier contractor enters a personal identification number ("PIN") in the appropriate field and affixes an electronic signature by clicking the "SIGN/SUBMIT" button. Although the sub-tier contractor is able to submit lien waiver documents and requests for payment using this limited interface, the remaining functionality is greatly reduced. As compared to the prime contractor interface of FIG. 42, fewer links are displayed under the "PROJECTS" heading. As such, the sub-tier contractor in this example is unable to view project budgets, schedules, or status information. This limited interface simplifies the lien waiver submission process for the sub-tier contractor and ensures that the sub-tier contractor does not have access to detailed project information.

Figure 44:
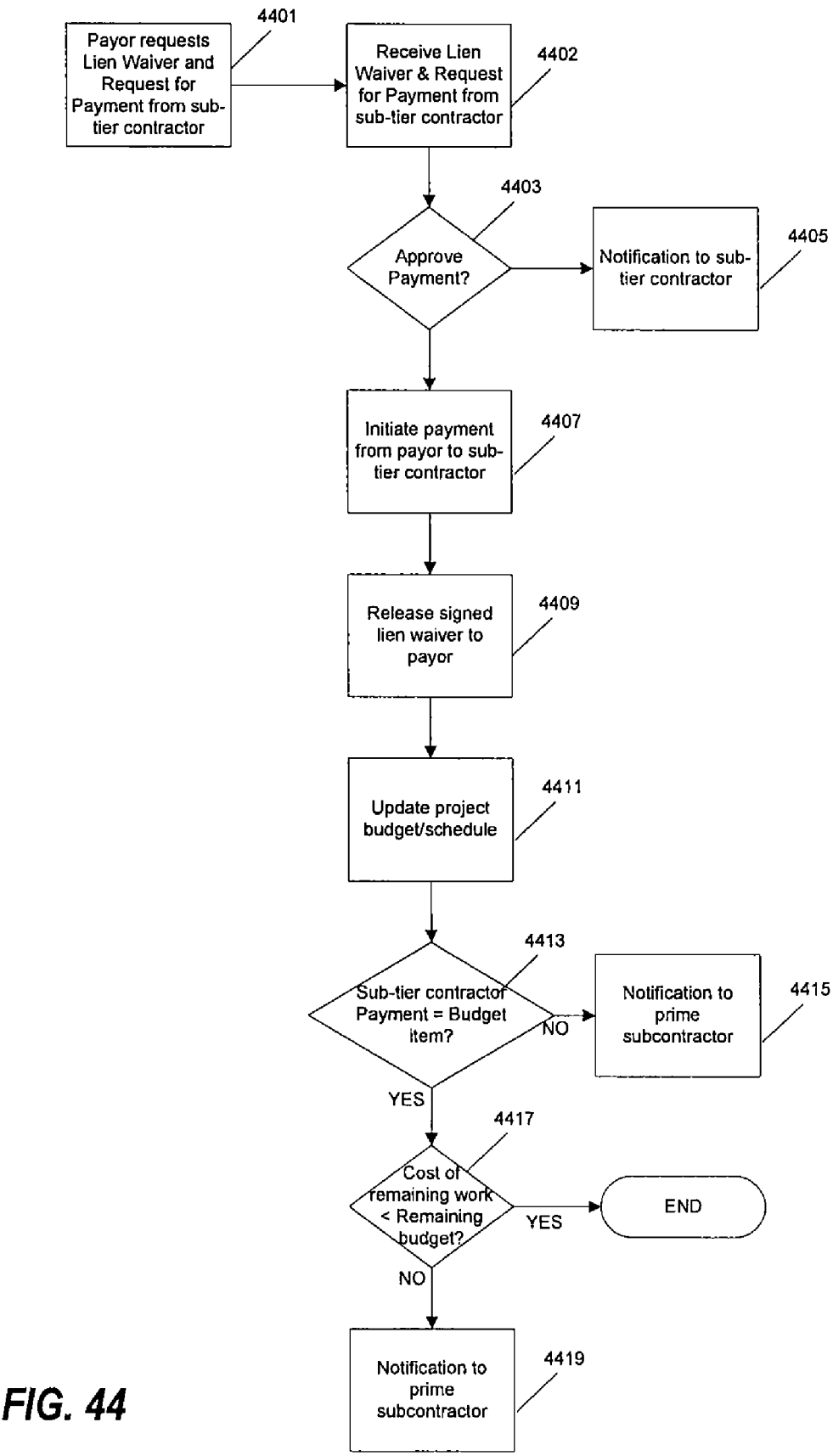
FIG. 44 is a flowchart of a lien waiver exchange process with project budget and project schedule monitoring functionality.

As illustrated in the example of FIG. 41, the payment is made directly from the parent (i.e., the General Contractor) to the grandchild (i.e., Subcontractor IV). However, the child (i.e., Subcontractor I) is responsible for approving or disapproving the payment. As such, the CPMS 10 is able to track payment information without providing full functionality to the sub-tier contractor as illustrated in FIG. 44. The payor requests a lien waiver and request for payment from the sub-tier contractor through the CPMS 10 (step 4401). The sub-tier contractor submits a signed lien waiver and a request for payment (step 4402). The prime subcontractor (i.e., the contractual "parent" of the sub-tier contractor) approves or denies the payment (step 4403). If the prime subcontractor denies the payment, a notification is sent to the sub-tier contractor (step 4405). If the payment is approved, the CPMS 10 initiates payment from the payor to the sub-tier contractor (step 4407). As described above, the payor is unable to access the signed lien waiver until after the payment has been initiated.

After payment is initiated, the CPMS 10 releases the signed lien waiver to the payor (step 4409) and updates the project budget and project schedule (step 4411). The CPMS 10 matches the payment to a line item in the project budget, marks the item in the budget as paid, and updates the project schedule to reflect that the work has been completed by the sub-tier contractor. The CPMS 10 then uses this updated project information to perform error-checking and to provide an early warning of payment discrepancies. If the payment requested by the sub-tier contractor and approved by the prime contractor does not match the budgeted amount (step 4413), a notification is sent to the prime contractor informing him that he may be at risk of exceeding his budget (step 4415). Similarly, if the cost of the remaining work (as indicated in the project schedule and status information) exceeds the remaining budget for the prime subcontractor (step 4417), another notification is sent to the prime subcontractor.

Furthermore, some embodiments of the system prevent the electronic initiation of a payment from the payor to the sub-tier contractor if such a payment would exceed the total amount of money budgeted to the prime subcontractor for the project. For example, a prime subcontractor has received a budget of $50,000 to complete a portion of the construction project. The payor has already made payments to the prime subcontractor in the amount of $40,000, leaving $10,000 remaining. If the prime contractor then approves a request from a sub-tier contractor for a $12,000 payment, the CPMS 10 will not initiate an electronic payment to the sub-tier contractor. In such a case, the CPMS 10 will generate a notification to the payor and the prime subcontractor indicating that the approved payment would exceed the total budget allocated to the prime subcontractor. The notification instructs the payor and the subcontractor that such a payment must be made by manual check. If the payor agrees to pay the requested amount to the sub-tier contractor, the CPMS 10 will update the project schedules and budgets to reflect the payment upon receiving confirmation of the payment from the payor and/or the sub-tier contractor.

By providing the sub-tier contractor with a subset of the functionality available through the CPMS 10, the bandwidth and connectivity demands are lessened and the financial cost of operating and accessing the system are minimized. However, even the limited functionality allows the CPMS 10 to track and maintain project budget and schedules, secure the necessary documentation (e.g., lien waivers from sub-tier contractors), and provide for efficient project payment.

It should be understood by one of ordinary skill in the art that constructions and methods described above are illustrative and not limiting. Other configurations, designs, and uses are possible. For example, various embodiments of the CPMS might be applied to a "homebuilder" engaged in residential construction or a builder engaged in non-residential construction. Furthermore, the payor may not be the builder, but rather, for example, a bank or property owner. In such cases, builder 74 could be a payee. Various payees may also include, for example, vendors, material suppliers, and subcontractors. Also, although the above examples describe a lien waiver exchange, it may be possible to apply this methodology to other types of documents.

Additionally, the term "sub-tier contractor" is not limited to the sub-of-subcontractor situation described in the examples above. Unless explicitly stated otherwise, a sub-tier contractor can include any construction project participant that is not the "payor." Furthermore, terms such as "contractual parent," "child," and "grandchild" are used to indicate relative levels within a construction project hierarchy. Therefore, a "contractual child" can be any participant below the payor in the construction project hierarchy. Similarly, a "contractual grandchild" can be any participant below a "contractual child" in the construction project hierarchy. Various features and advantages of the invention are set forth in the following claims.

The invention claimed is:

1. A computer implemented method of managing a construction project payment process comprising:
   receiving an electronically signed document and a request for payment from a first participant associated with a construction project;
   storing the electronically signed document to a computer-readable memory and preventing other participants from accessing the signature of the electronically signed document, wherein the other participants include a second participant that is a contractual parent of the first participant and a third participant that is a payor associated with the construction project, wherein the second participant and the third participant include different organizations participating in the construction project;
   electronically transmitting a notification of the request for payment to the second participant;
   receiving approval of the request for payment from the second participant; and
   initiating a payment to the first participant after receiving approval from the second participant.

2. The method of claim 1, wherein the payment is initiated from the third participant to the first participant.

3. The method of claim 2, further comprising releasing the electronically signed document to the third participant after initiating the payment to the first participant.

4. The method of claim 1, wherein the payment is initiated from the second participant to the first participant, and further comprising
   initiating a second payment from the third participant to the second participant; and
   releasing the electronically signed document to the third participant after initiating the payment from the third participant to the second participant.

5. The method of claim 1, wherein the second participant is a contractual child of the third participant and the first participant is a subcontractor of the second participant.

6. The method of claim 1, further comprising releasing the electronically signed document to the third participant after initiating the payment.

7. The method of claim 1, further comprising
   accessing a project budget and a project schedule from the computer-readable memory;
   identifying a line-item in the budget corresponding to the received request for payment;
   updating the project budget to indicate that the payment has been made;
   updating the project schedule to indicate that work associated with the request for payment has been completed; and
   storing the updated project budget and the updated project schedule to the computer-readable memory.

8. The method of claim 1, further comprising:
   updating a project budget based on the requested payment; and
   notifying at least one participant associated with the construction project of any discrepancies between the project budget and the requested payment.

9. The method of claim 1, wherein the act of initiating payment is executed by a computer processor upon receiving approval of the requested payment from the second participant without intervention from the third participant.

10. The method of claim 1, wherein the act of receiving a request for payment includes receiving payment information from the first participant and electronically generating an invoice.

11. The method of claim 1, wherein the act of initiating payment includes electronically communicating with an automated clearing house.

12. The method of claim 1, wherein the act of initiating payment includes automatically effectuating an electronic funds transfer.

13. The method of claim 1, wherein the third participant is a general contractor, the second participant is a subcontractor, and the first participant is a sub-tier contractor.

14. The method of claim 1, wherein the third participant is a property owner, the second participant is a general contractor, and the first participant is a subcontractor.

15. The method of claim 1, wherein the electronically signed document is a lien waiver.

* * * * *